US009342962B2

(12) United States Patent
Lee

(10) Patent No.: US 9,342,962 B2
(45) Date of Patent: May 17, 2016

(54) GAMING MACHINE AND METHODS OF ALLOWING A PLAYER TO PLAY GAMING MACHINES HAVING EXPANDING SYMBOL POSITIONS

(71) Applicant: Konami Gaming, Inc., Las Vegas, NV (US)

(72) Inventor: Arthur Lee, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 2 days.

(21) Appl. No.: 14/029,026

(22) Filed: Sep. 17, 2013

(65) Prior Publication Data

US 2014/0179400 A1 Jun. 26, 2014

(51) Int. Cl.

| | |
|---|---|
| ***G06F 17/00*** | (2006.01) |
| ***G06F 19/00*** | (2011.01) |
| ***G07F 17/34*** | (2006.01) |
| *G07F 17/32* | (2006.01) |

(52) U.S. Cl.

CPC .............. *G07F 17/34* (2013.01); *G07F 17/326* (2013.01)

(58) Field of Classification Search

CPC ... G07F 17/32; G07F 17/326; G07F 17/3262; G07F 17/3265; G07F 17/3267; G07F 17/3286; G07F 17/34; G07F 17/3244

See application file for complete search history.

(56) References Cited

U.S. PATENT DOCUMENTS

| | | | | |
|---|---|---|---|---|
| 6,394,902 | B1 * | 5/2002 | Glavich et al. | 463/20 |
| 8,096,869 | B2 | 1/2012 | Yoshimi | |
| 2004/0058727 | A1 * | 3/2004 | Marks et al. | 463/20 |
| 2006/0183533 | A1 * | 8/2006 | Tran et al. | 463/20 |
| 2006/0183534 | A1 * | 8/2006 | Yoshimi | 463/20 |
| 2008/0064465 | A1 | 3/2008 | Bennett | |
| 2008/0318664 | A1 * | 12/2008 | Saito | G07F 17/3244 463/20 |
| 2008/0318667 | A1 * | 12/2008 | Saito | G07F 17/32 463/21 |
| 2010/0048286 | A1 * | 2/2010 | Okada et al. | 463/20 |
| 2010/0304820 | A1 * | 12/2010 | Okada | 463/16 |
| 2010/0304821 | A1 * | 12/2010 | Okada | 463/16 |
| 2010/0304834 | A1 * | 12/2010 | Okada | 463/20 |

(Continued)

FOREIGN PATENT DOCUMENTS

| | | | |
|---|---|---|---|
| JP | 2008062036 | A2 | 3/2008 |
| JP | 2009000450 | A2 | 1/2009 |

OTHER PUBLICATIONS

Patent Examination Report No. 1—Date of Issue Mar. 22, 2013.
Patent Examination Report No. 1 (AU 2013273823)—Date of Issue Apr. 16, 2014.
Patent Examination Report No. 1 (AU 2015200029); Date of Issue: Mar. 23, 2015.

(Continued)

*Primary Examiner* — Milap Shah
(74) *Attorney, Agent, or Firm* — Howard & Howard Attorneys PLLC

(57) ABSTRACT

A method of allowing a player to play a gaming machine is described herein. The method includes displaying, on a display device, a game including at least one reel being displayed with a plurality of normal symbol positions and a plurality of special symbol positions. The method includes determining a first amount of special symbol positions being displayed in a first instance of the game, spinning and stopping the at least one reel to display the first instance on the display device including the at least one reel being displayed with the first amount of special symbol positions, determining a second amount of special symbol positions being displayed in a second instance of the game, and spinning and stopping the at least one reel to display the second instance including the at least one reel being displayed with the second amount of special symbol positions.

27 Claims, 13 Drawing Sheets

(56) References Cited

U.S. PATENT DOCUMENTS

| | | | | |
|---|---|---|---|---|
| 2010/0304845 | A1* | 12/2010 | Ogino et al. | 463/25 |
| 2010/0304846 | A1* | 12/2010 | Ogino et al. | 463/25 |
| 2011/0014967 | A1* | 1/2011 | Yoshizawa | 463/20 |
| 2011/0053677 | A1* | 3/2011 | Munakata et al. | 463/20 |
| 2011/0098103 | A1* | 4/2011 | Munakata et al. | 463/22 |
| 2011/0098107 | A1* | 4/2011 | Gomez et al. | 463/27 |
| 2012/0135799 | A1* | 5/2012 | Okada et al. | 463/25 |

OTHER PUBLICATIONS

Australian Patent Examination Report No. 2 for Australian Patent Application No. 2015200029 mailed Oct. 5, 2015.

Japanese Office Action for Japanese Patent Application No. P2014-147019 mailed Oct. 6, 2015.

Patent Examination Report No. 3 (AU 2015200029); Date of Issue: Feb. 26, 2016.

* cited by examiner

GAMING MACHINE AND METHODS OF ALLOWING A PLAYER TO PLAY GAMING MACHINES HAVING EXPANDING SYMBOL POSITIONS

CROSS REFERENCE TO RELATED APPLICATION

This application claims priority to Australian Patent Application No. 2012-275033, filed Dec. 24, 2012, the disclosure of which is hereby incorporated by reference in its entirety.

TECHNICAL FIELD

The subject matter disclosed herein relates generally to gaming machines and more particularly, to an apparatus and method for allowing players to play gaming machines having expanding symbol positions.

BACKGROUND OF THE INVENTION

Gaming machines, such as slot machines, are a cornerstone of the gaming industry. At least some known gaming machines include a video display device to display a reel game that includes a plurality of reels, wherein each reel includes a plurality of symbols. During game play, the gaming machine accepts a wager from a player, the player selects one or more paylines, the gaming machine spins the reels, and sequentially stops each reel to display the generated combination of symbols on the reels. The gaming machine then awards the player an award based on the combination of symbols orientated along the selected payline.

At least some known gaming machines display reels having a plurality of special symbols displayed within the reel. Known reels include a predefined number of special symbols displayed in each reel. Over time, during game play, the player may become aware of the number of special symbols that are displayed in each reel and may become frustrated because the number of special symbols within each reel remains constant for each game play. Accordingly, new features are necessary to appeal to player interest and enhance excitement in order to entice longer play and increased profitability. The present invention is directed to satisfying these needs.

SUMMARY OF THE INVENTION

In one aspect of the present invention, a method of allowing a player to play a gaming machine is provided. The method includes displaying, on a display device, a game including at least one reel. The at least one reel includes a plurality of symbol positions that have a plurality of normal symbols positions and a plurality of special symbol positions. The outcome of the game is randomly generated and displayed on the display device. The method also includes randomly determining a number of special symbol positions being displayed on the at least one reel and spinning and stopping the at least one reel to display the generated game outcome, wherein the reel includes the determined number of special symbol positions.

In another aspect of the present invention, a gaming machine is provided. The gaming machine includes a display device for displaying a game, a user input device configured to generate a signal indicative of a player's selection input, and a controller coupled to the display device and the user input device for displaying the game including at least one reel having a plurality of symbol positions. The plurality of symbol positions includes a plurality of normal symbols positions and a plurality of special symbol positions. The controller is configured to randomly generate an outcome of the game and display the game outcome on the display device. The controller also randomly determines a number of special symbol positions being displayed on the reel, and spins and stops the at least one reel to display the generated game outcome, including the reel having the determined number of special symbol positions.

In yet another aspect of the present invention, a system is provided. The system includes a plurality of gaming devices and a system controller that is coupled to each gaming device. Each gaming device includes a user input device for accepting a player's selection input and a display device. The system controller is configured to display a game on at least one gaming device. The game includes at least one reel including a plurality of symbol positions, wherein the plurality of symbol positions include a plurality of normal symbols positions and a plurality of special symbol positions. The system controller randomly generates an outcome of a game and displays the game outcome on the display device. The system controller also randomly determines a number of special symbol positions being displayed on the at least one reel and spins and stops the at least one reel to display the generated game outcome including the reel having the determined number of special symbol positions.

In yet another aspect of the present invention, a method of allowing a player to play a gaming machine is provided. The method includes displaying, on a display device, a game including at least one reel including a plurality of symbol positions. The plurality of symbol positions being displayed with a plurality of normal symbol positions and a plurality of special symbol positions. The method includes determining a first amount of special symbol positions being displayed with the at least one reel in a first instance of the game, spinning and stopping the at least one reel to display the first instance on the display device including the at least one reel being displayed with the first amount of special symbol positions, determining a second amount of special symbol positions being displayed with the at least one reel in a second instance of the game, wherein the second amount of special symbol positions being different than the first amount of special symbol positions, and spinning and stopping the at least one reel to display the second instance including the at least one reel being displayed with the second amount of special symbol positions.

In another aspect of the present invention, a gaming machine is provided. The gaming machine includes a display device for displaying a game, a user input device configured to generate a signal indicative of a player's selection input, and a controller coupled to the display device and the user input device for displaying the game including at least one reel having a plurality of symbol positions. The plurality of symbol positions includes a plurality of normal symbols positions and a plurality of special symbol positions. The controller is configured to display the game including at least one reel being displayed with a plurality of symbol positions including a plurality of normal symbol positions and a plurality of special symbol positions, determine a first amount of special symbol positions being displayed with the at least one reel in a first instance of the game, spin and stop the at least one reel to display the first instance on the display device including the at least one reel being displayed with the first amount of special symbol positions, determine a second amount of special symbol positions being displayed with the at least one reel in a subsequent second instance of the game, and spin and stop the at least one reel to display the second instance including the at least one reel being displayed with the second amount of special symbol positions.

In yet another aspect of the present invention, one or more non-transitory computer-readable storage media, having computer-executable instructions embodied thereon is provided. The computer-executable instructions cause a processor to display, on a display device, a game including at least one reel being displayed with a plurality of symbol positions including a plurality of normal symbol positions and a plurality of special symbol positions. The computer-executable instructions also causes the processor to determine a first amount of special symbol positions being displayed with the at least one reel in a first instance of the game, spin and stop the at least one reel to display the first instance including the at least one reel being displayed with the first amount of special symbol positions, determine a second amount of special symbol positions being displayed with the at least one reel in a subsequent second instance of the game, and spin and stop the at least one reel to display the second instance including the at least one reel being displayed with the second amount of special symbol positions.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

Figure 1:
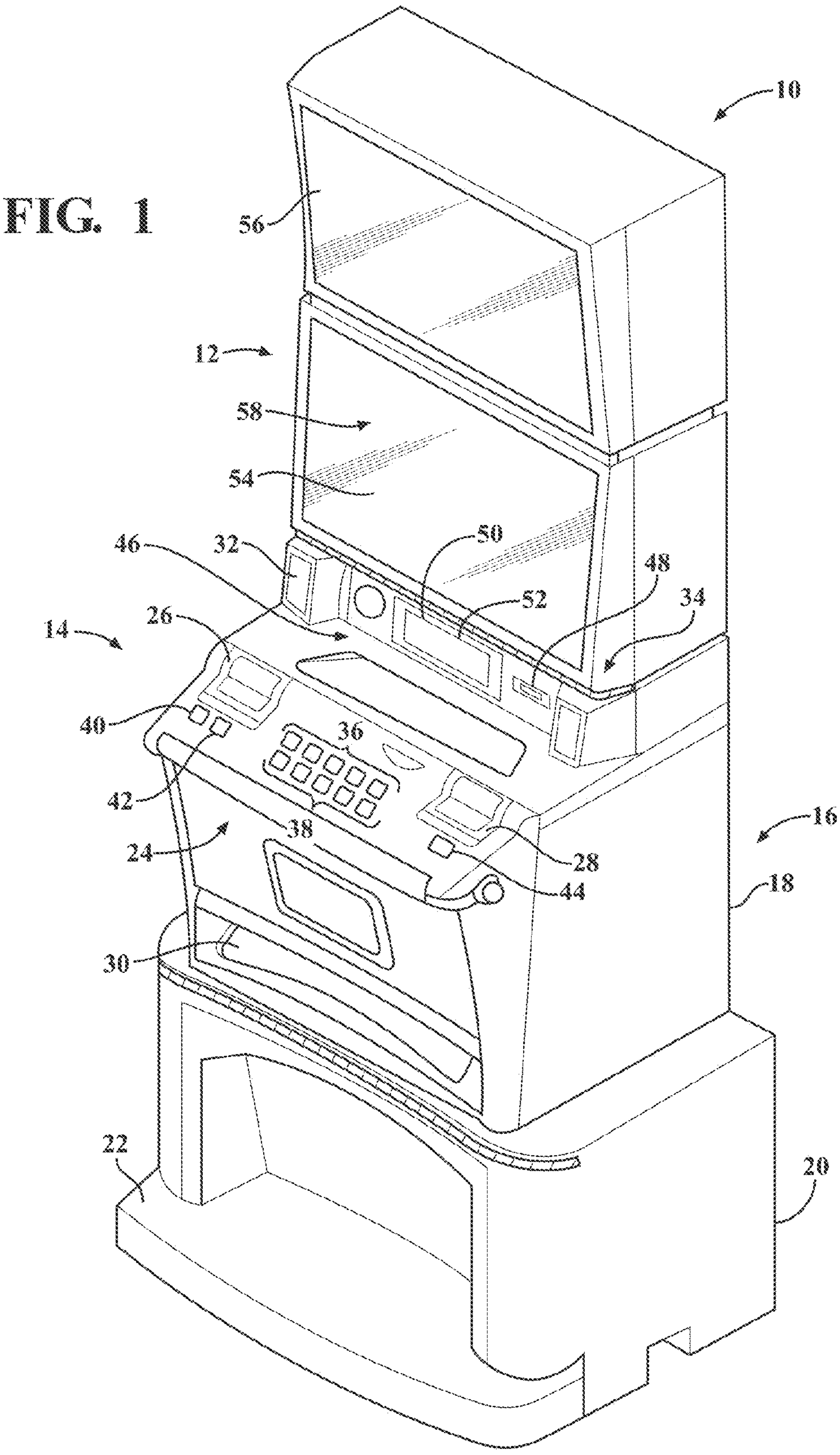
FIG. 1 is a perspective view of an exemplary gaming machine of the present invention.

With reference to the drawings and in operation, the present invention overcomes at least some of the disadvantages of known gaming machines by providing a gaming machine that generates an outcome of a game including at least one reel, and displays the generated outcome including a plurality of special symbols being displayed on the at least one reel to facilitate increasing a player's expectation of achieving a winning combination in the generated game. More specifically, the gaming machine randomly selects a number of special symbol positions being displayed on the reel and displays the game outcome including the at least one reel having the selected number of special symbol positions. In one embodiment of the present invention, the gaming machine may also randomly select at least one special symbol and display the selected special symbol in each of the special symbol positions. By providing a gaming machine that randomly selects a number of special symbol positions being displayed on at least one reel, the player's expectation for achieving a win is increased and the enjoyment of the game is improved. The player's expectation may also be increased by randomly selecting a special symbol to be displayed in each of the special symbol positions. Thus, the amount of time that the game is played by patrons of a gaming establishment is thereby increased.

In addition, the present invention overcomes at least some of the disadvantages of known gaming machines by providing a gaming machine that increases an amount of special symbols being displayed with a reel during subsequent instances of the game. More specifically, the gaming machine may award a bonus feature game to a player as a function of an outcome of a main game, and provide a plurality of free spins with the bonus feature. The gaming machine may provide a first amount of special symbols being displayed with a reel in the first instance, e.g. a first free spin, of the bonus feature game, and increase the amount of special symbols being displayed with the reel in each subsequent free spin. By increasing the amount of special symbols appearing with the reel for each free spin, the chances of achieving a winning outcome by the player is increased for each subsequent free spin.

In general, the gaming machine 10 allows a player to initiate a gaming session to play a plurality of video slot games via the gaming machine 10. The gaming machine 10 displays a game, accepts a wager on the game, generates a game outcome including a plurality of symbols at a plurality of symbol positions, and provides an award to the player if a winning combination is displayed in the generated game outcome. During play of the game, the gaming machine 10 displays at least one reel including a plurality of special symbol positions and a plurality of normal symbol positions. The gaming machine 10 randomly selects a number of special symbol positions being displayed in the at least on reel, and selects one of a plurality of special symbols. The gaming machine 10 also displays the selected special symbol in each of the selected number of special symbol positions, and displays a plurality of normal symbols in each of the normal symbol positions. During game play, the gaming machine 10 spins the at least one reel to display, to the player, the selected number of special symbol positions including the selected special symbol and a number of normal symbol positions including a plurality of normal symbols, and stops the at least one reel to display the generated outcome to the player. Because the gaming machine 10 displays a reel with a plurality of special symbols, the player's anticipation of a winning outcome is increased, thus increasing the period of time the gaming machine 10 is played by the player.

In addition the gaming machine 10 may determine a first amount of special symbols being displayed with a reel during a first instance of the game, and determine a second amount of special symbols being displayed with the reel during a subsequent second instance of the game that is displayed after the first instance. In addition, the gaming machine 10 may increase the amount of special symbols being displayed in the reel for each subsequent instance of the game that is played by the player. Moreover, the gaming machine 10 may increase the amount of special symbols displayed with the reel until the player achieves a winning game outcome. For example, in one embodiment, the gaming machine 10 may display a reel with first amount of special symbols in the first instance of the game and, if a winning outcome is not achieved in the first instance, increase the amount of special symbols being displayed with the reel during each subsequent game instance until a winning game outcome is achieved.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2:
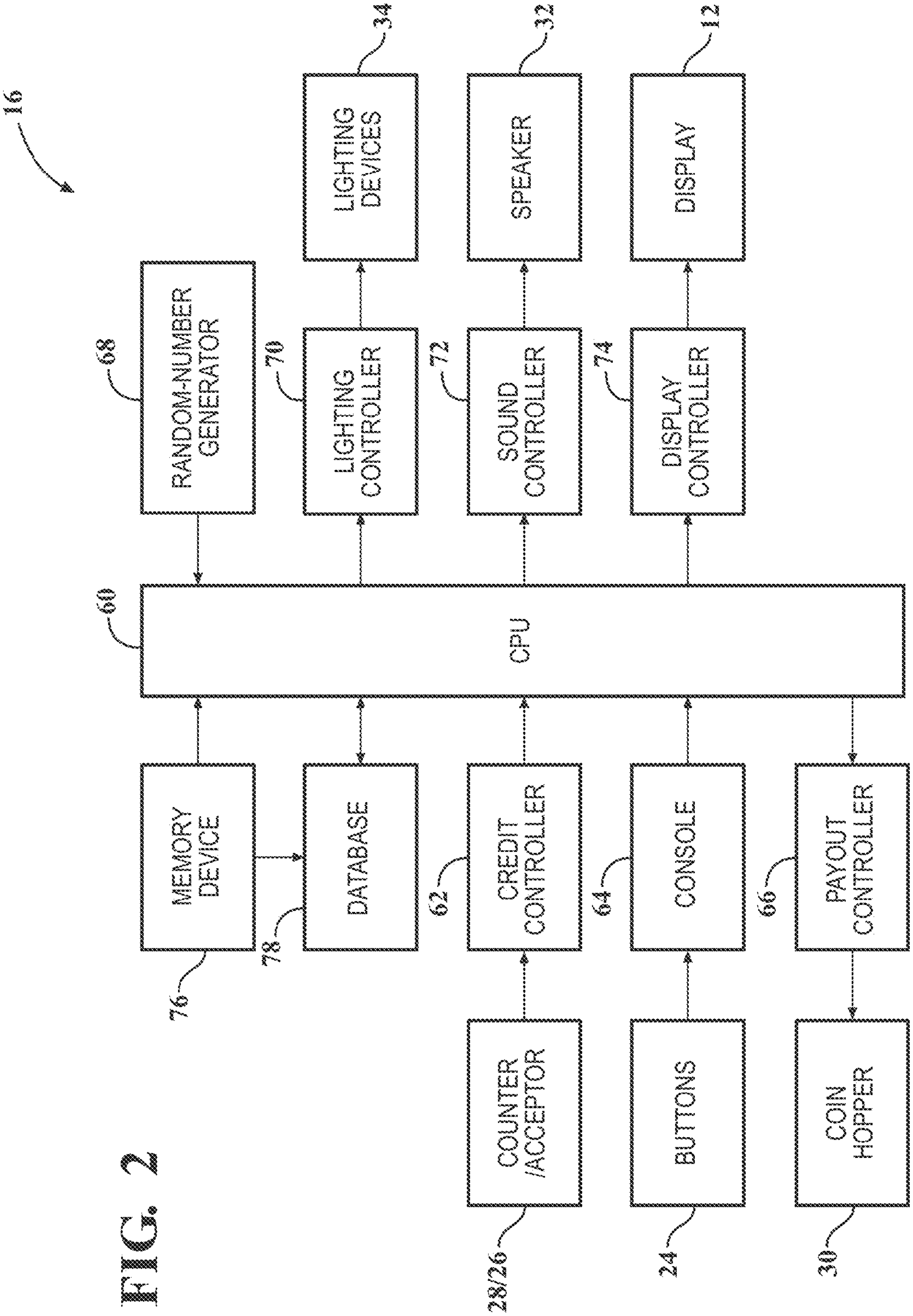
FIG. 2 is a schematic representation of the gaming machine shown in FIG. 1.

FIG. 1 is a perspective view of an exemplary gaming machine 10. FIG. 2 is a schematic representation of the gaming machine 10. A preferred embodiment of the present invention is a video gaming machine preferably installed in a casino. In the illustrated embodiment, the gaming machine 10 includes a display device 12 for displaying a plurality of games, a user input device 14 to enable a player to interface with the gaming machine 10, and a gaming controller 16 that is operatively coupled to the display device 12 and the user input device 14 to enable a player to play games displayed on the display device 12. The gaming machine 10 also includes a cabinet assembly 18 that is configured to support the display device 12, the user input device 14, and/or the gaming controller 16 from a gaming stand 20 and/or a supporting surface 22.

The display device 12 and the user input device 14 are coupled to the cabinet assembly 18 and are accessible by the player. In one embodiment, the gaming controller 16 is positioned within the cabinet assembly 18. Alternatively, the gaming controller 16 may be separated from the cabinet assembly 18, and connected to components of the gaming machine 10 through a network such as, for example, a local area network (LAN), a wide area network (WAN), dial-in-connections, cable modems, wireless modems, and/or special high-speed Integrated Services Digital Network (ISDN) lines.

In one embodiment, the user input device 14 includes a plurality of input buttons 24, a coin slot 26, and/or a bill acceptor 28. The coin slot 26 includes an opening that is configured to receive coins and/or tokens deposited by the player into the gaming machine 10. The gaming machine 10 converts a value of the coins and/or tokens to a corresponding amount of gaming credits that are used by the player to wager on games played on the gaming machine 10.

The bill acceptor 28 includes an input and output device that is configured to accept a bill, a ticket, and/or a cash card into the bill acceptor 28 to enable an amount of gaming credits associated with a monetary value of the bills, ticket, and/or cash card to be credited to the gaming machine 10. Moreover, the gaming machine 10 may also utilize a cashless wagering system (not shown), such as a ticket in ticket out (TITO) system (not shown). In one embodiment, the bill acceptor 28 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown).

A coin tray 30 is coupled to the cabinet assembly 18 and is configured to receive a plurality of coins that are dispensed from the gaming machine 10. One or more speakers 32 are installed inside the cabinet assembly 18 to generate voice announcements and/or sound effects associated with game play. The gaming machine 10 also includes one or more lighting devices 34 that are configured to blink and/or change brightness and color in specific patterns to produce lighting effects to enhance a visual gaming experience for the player.

In one embodiment, the input buttons 24 include a plurality of BET switches 36 for inputting a wager on a game, a plurality of selection switches 38 for selecting a betting line and/or card, a MAXBET switch 40 for inputting a maximum wager, a PAYOUT switch 42 for ending a gaming session and dispensing accumulated gaming credits to the player, and a start switch, i.e., a SPIN/DEAL button 44 to initiate an output of a game.

In the illustrated embodiment, the BET switches 36 include five switches from 1BET to 5BET to enable a player to wager between a minimum bet up to 5× minimum bet. Each selection switch 38 corresponds to a betting line such as, for example, a payline and/or symbol for a reel game, one or more cards for a card game, and/or a symbol for a roulette game, to enable a player to associate a wager with one or more betting lines. The MAXBET switch 40 enables a player to input the maximum bet that a player can spend against one time of a game. The PAYOUT switch 42 enables a player to receive the amount of money and/or credits awarded to the player during a gaming session, which has been credited onto the gaming machine 10.

The gaming machine 10 may also include a player tracking device 46 that is coupled to the gaming controller 16 for identifying the player and/or a player tracking account that is associated with the player. The player tracking account may include, but is not limited to, gaming credits available to the player for use in playing the gaming machine 10. The player tracking device 46 is configured to communicate player account information between a player tracking controller (not shown) and the gaming machine 10. For example, the player tracking device 46 may be used to track bonus points and/or credits awarded to the player during a gaming session and/or track bonus and/or credits downloaded to the gaming machine 10 from the player tracking system.

The player tracking device 46 is coupled to the gaming cabinet assembly 18 and includes a player identification card reader 48, a data display 50, and a keypad 52. The player identification card reader 48 is configured to accept a player tracking card (not shown) inserted by the player, and read information contained on the player tracking card to identify the player account information. The player identification card reader 48 may include, but is not limited to, a barcode reader, a magnetic card reader, and/or a radio frequency identification (RFID) card reader. The keypad 52 is configured to accept a user selection input such as, for example, a unique player personal identification number (PIN) to facilitate enabling the gaming machine 10 to identify the player, and access player account information associated with the identified player to be displayed on the data display 50. In one embodiment, the data display 50 includes a touchscreen panel that includes the keypad 52. Alternatively, the data display 50 and the keypad 52 may be included in the display device 12.

In one embodiment, the display device 12 includes a first display 54 and a second display 56. The first display 54 is configured to display a game screen 58 (shown in FIG. 3) including indicia and/or symbols for use in a game, e.g., cards used by a card game, roulette wheel and symbols used in a roulette game, and reels used in a reel game. The game screen 58 may include any type of game including, but not limited to, a video slot game, a keno game, a blackjack game, a video poker game, or any type of game which allows a player to make a wager, play a game, and potentially provide the player an award based on an outcome of the game and a paytable. The second display 56 is configured to display game play instructions for performing the game including, but not limited to, playing instructions, paytables, paylines, betting lines and/or any other information to enable the gaming machine 10 to function as described herein. Moreover, each display 54 and 56 may be configured to display at least a portion of the game screen 58 and/or game play instructions. In one embodiment, the first and second displays 54 and 56 each include a flat panel display, such as a cathode ray tube display (CRT), a liquid crystal display (LCD), a light-emitting diode display (LED), a plasma display, and/or any suitable visual output device capable of displaying graphical data and/or text to a user. Alternatively, a single component, such as a touch screen, may function as both the display device 12 and as the user input device 14. In an alternative embodiment, the first display 54 and/or the second display 56 includes a plurality of mechanical reels displaying a plurality of game symbols.

Referring to FIG. 2, in one embodiment, the gaming controller 16 includes a processor, i.e., a central processing unit (CPU) 60, a credit controller 62, a console unit 64, a payout controller 66, a random-number generator (RNG) 68, a lighting controller 70, a sound controller 72, a display controller 74, a memory device 76, and a database 78. Memory device 76 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 60 to store, retrieve, and/or execute instructions and/or data.

The CPU 60 executes various programs, and thereby controls other components of the gaming controller 16 according to player instructions and data accepted by the user input device 14. The CPU 60 in particular executes a game program, and thereby conducts a game in accordance with the embodiments described herein. The memory device 76 stores programs and databases used by the CPU 60. Moreover, the memory device 76 stores and retrieves information in the database 78 including, but not limited to, a game type, a number of reels associated with a game, a number of symbol positions being displayed on each reel, a type of symbols being displayed on each symbol position, a predefined set of normal symbols, a predefined set of special symbols, image data for producing game images and/or screens on the display device 12, and temporarily stores variables, parameters, and the like that are used by the CPU 60. In addition, the memory device 76 stores indicia, symbol weights, paytables, and/or winning combination tables which represent relationships between combinations of random numbers and types of awards. In one embodiment, the memory device 76 utilizes RAM to temporarily store programs and data necessary for the progress of the game, and EPROM to store, in advance, programs and data for controlling basic operation of the gaming machine 10, such as the booting operation thereof.

The credit controller 62 manages the amount of player's credits, which is equivalent to the amount of coins and bills counted and validated by the bill acceptor 28. The console unit 64 is coupled to the user input device 14 to monitor player selections received through the input buttons 24, and accept various instructions and data that a player enters through the input buttons 24. The payout controller 66 converts a player's credits to coins, bills, or other monetary data by using the coin tray 30 and/or for use in dispensing a credit voucher via the bill acceptor 28.

The lighting controller 70 controls one or more lighting devices 34 to blink and/or change brightness and color in specific patterns in order to produces lighting effects associated with game play. The sound controller 72 controls the speakers 32 to output voice announcements and sound effects during game play. The display controller 74 controls the display device 12 to display various images on screens preferably by using computer graphics and image data stored in the memory device 76. More specifically, the display controller 74 controls video reels in a game screen displayed on the first display 54 and/or the second display 56 by using computer graphics and the image data.

The RNG 68 generates and outputs random numbers to the CPU 60 preferably at the start of each round of a game. The CPU 60 uses the random numbers to determine an outcome of the games. For example, if the game is a video slot game, the CPU 60 uses the RNG 68 to randomly select an arrangement of symbols to be displayed on video reels. Moreover, the CPU 60 generally uses random numbers generated by the RNG 68 to play the games and to determine whether or not to provide an award to a player. In addition, the CPU 60 generates game outcomes including combinations of random numbers, and compares the generated combinations with winning combinations stored in the winning combination table to determine if the generated outcome is a winning outcome that is associated with a type of award.

Figure 3:
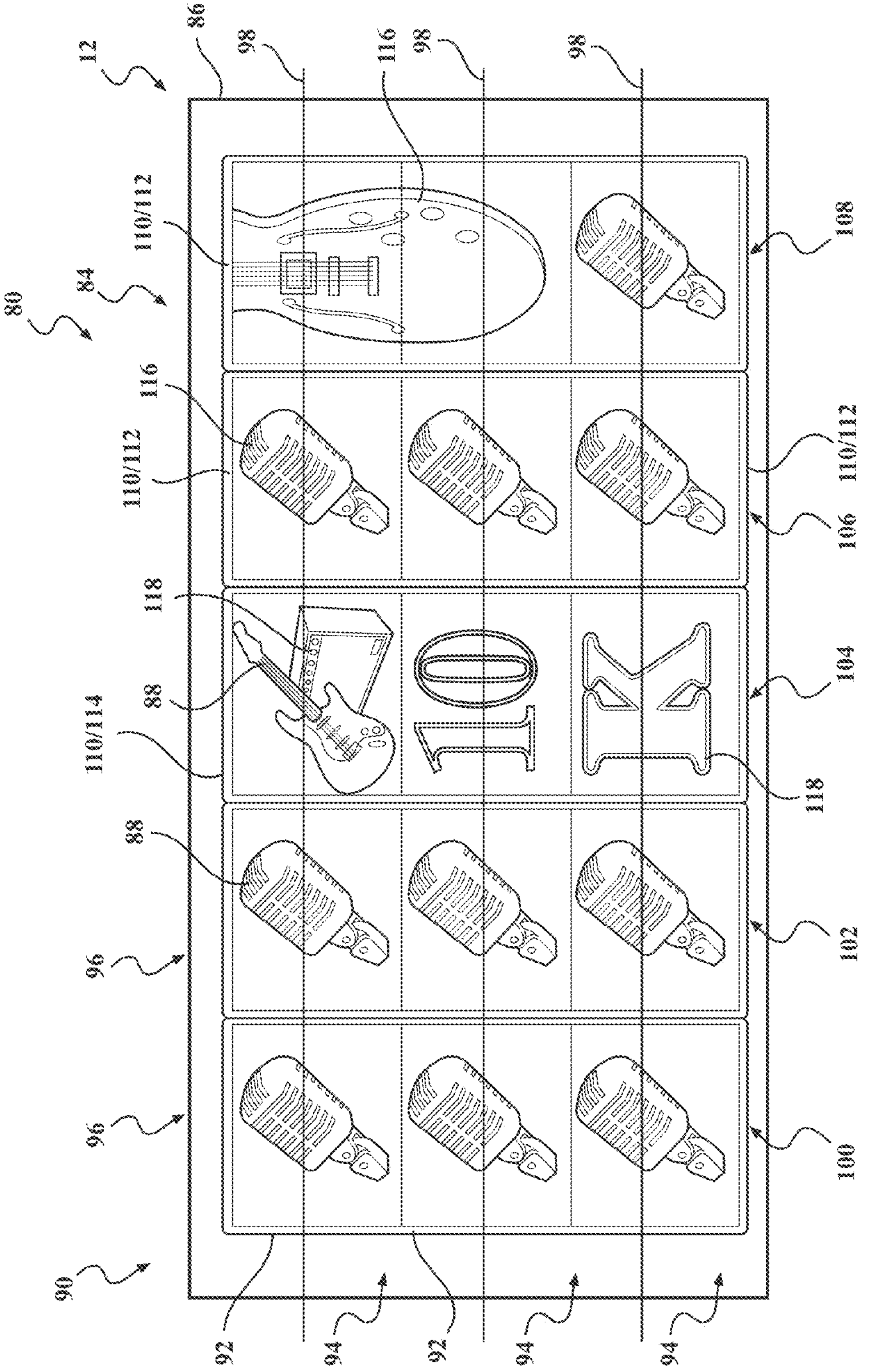
FIG. 3 is a graphical display of a video slot game, according to an embodiment of the present invention.
Figure 4:
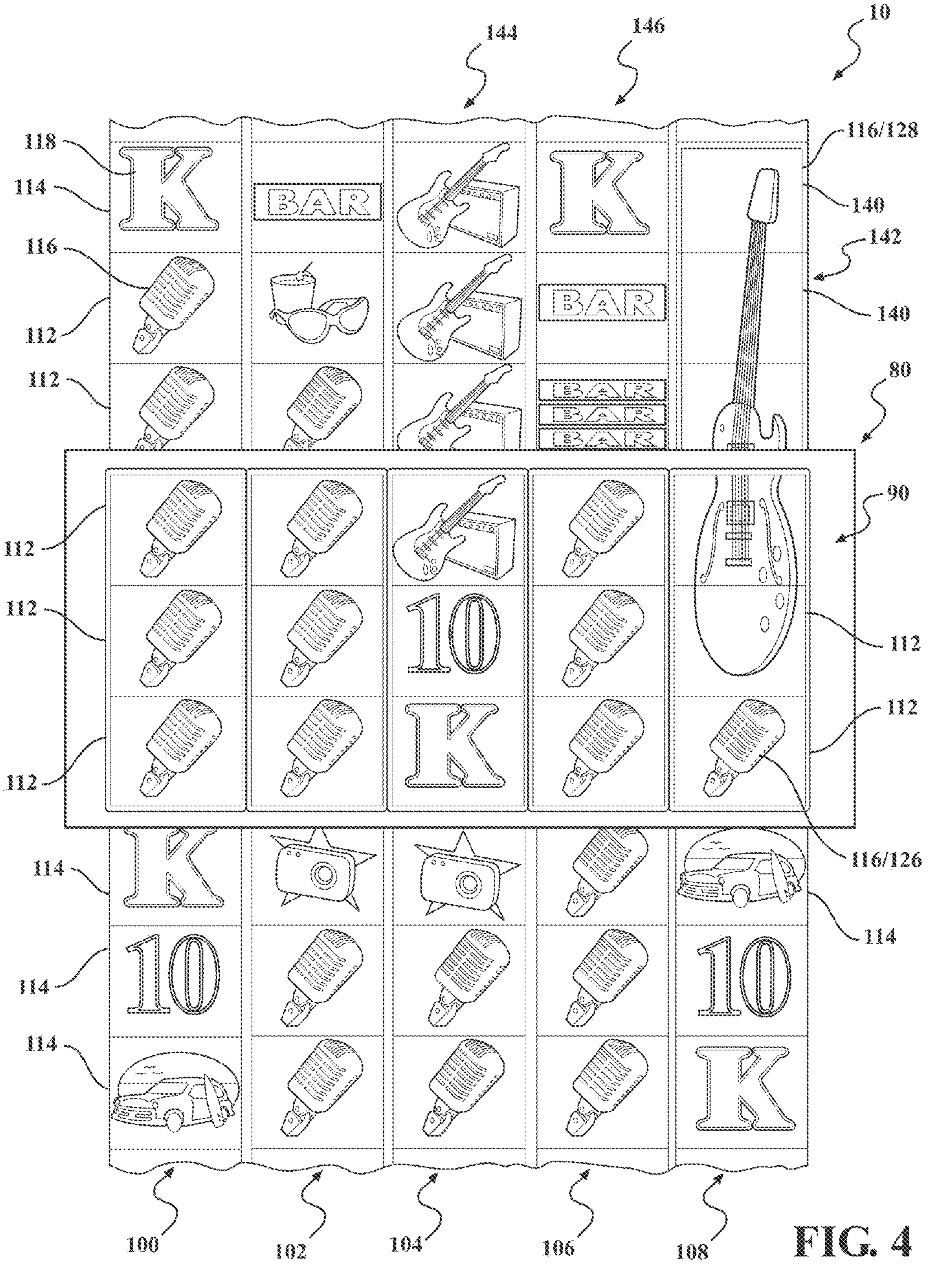
FIG. 4 is a schematic representation of a portion of the gaming machine shown in FIG. 1 including the video slot game of FIG. 3 illustrating a plurality of slot reels, according to an embodiment of the present invention.
Figure 5:
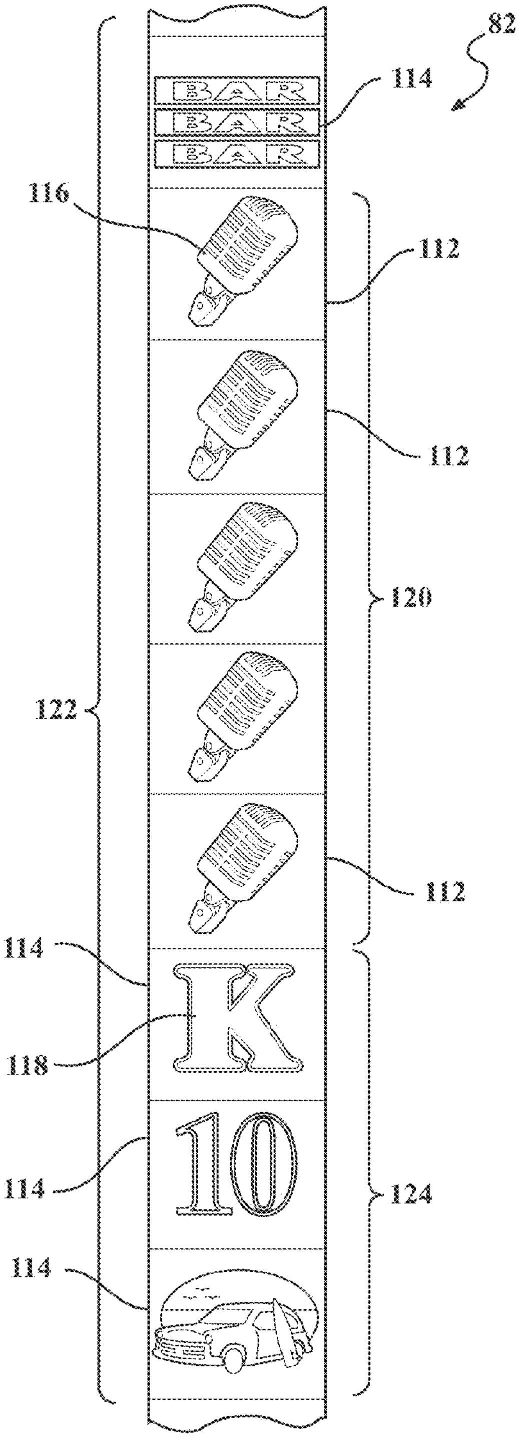
FIG. 5 is a schematic representation of a slot reel that may be used with the gaming machine shown in FIG. 4, according to an embodiment of the present invention.
Figure 6:
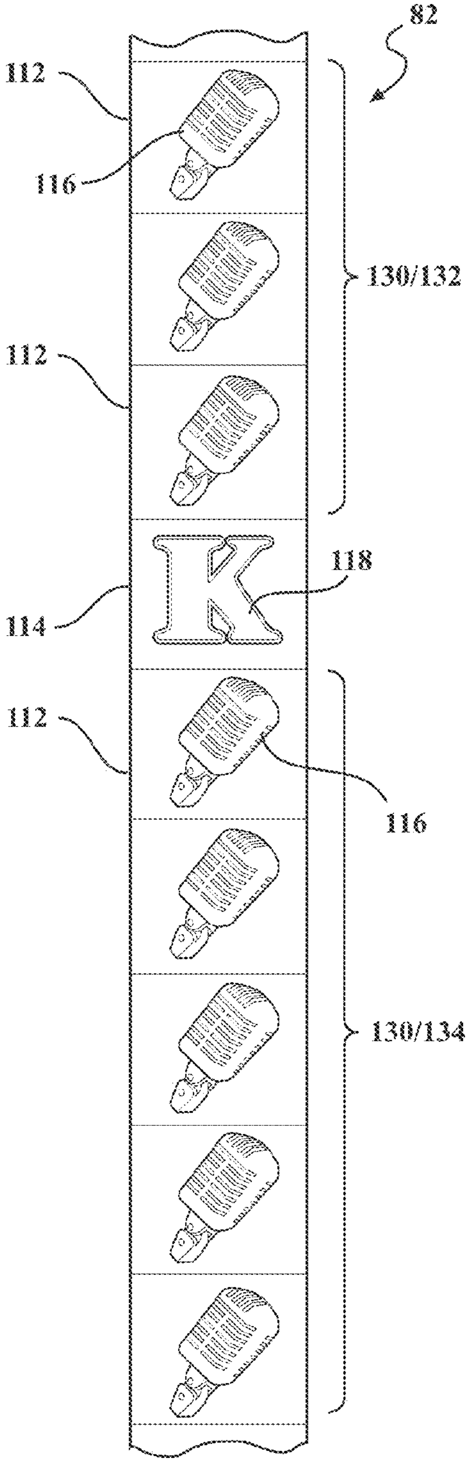
FIG. 6 is another schematic representation of the slot reel shown in FIG. 5, according to an embodiment of the present invention.
Figure 7:
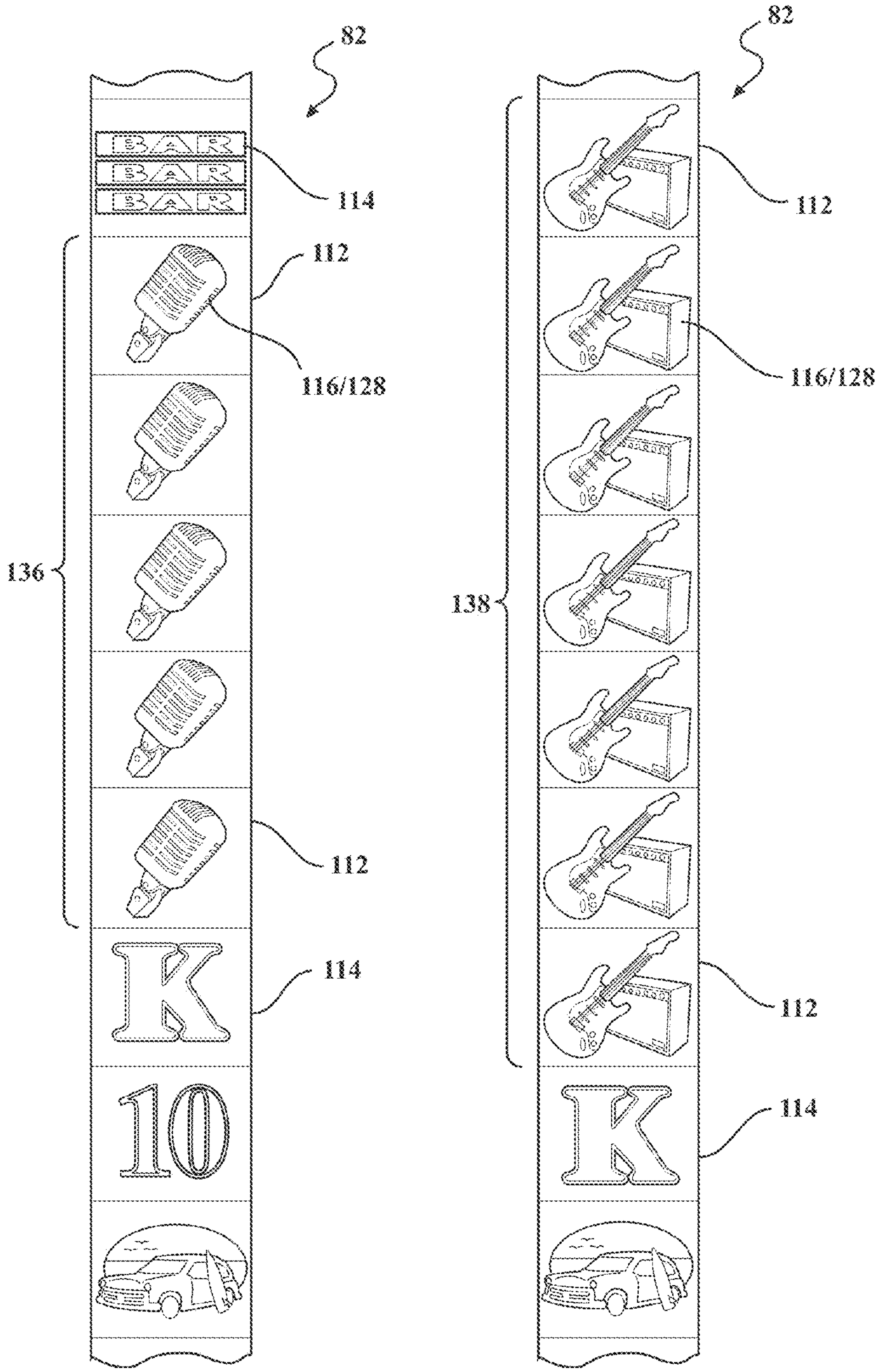
FIG. 7 is a schematic representation of two slot reels that may be used with the gaming machine shown in FIG. 4, according to an embodiment of the present invention.
Figure 8:
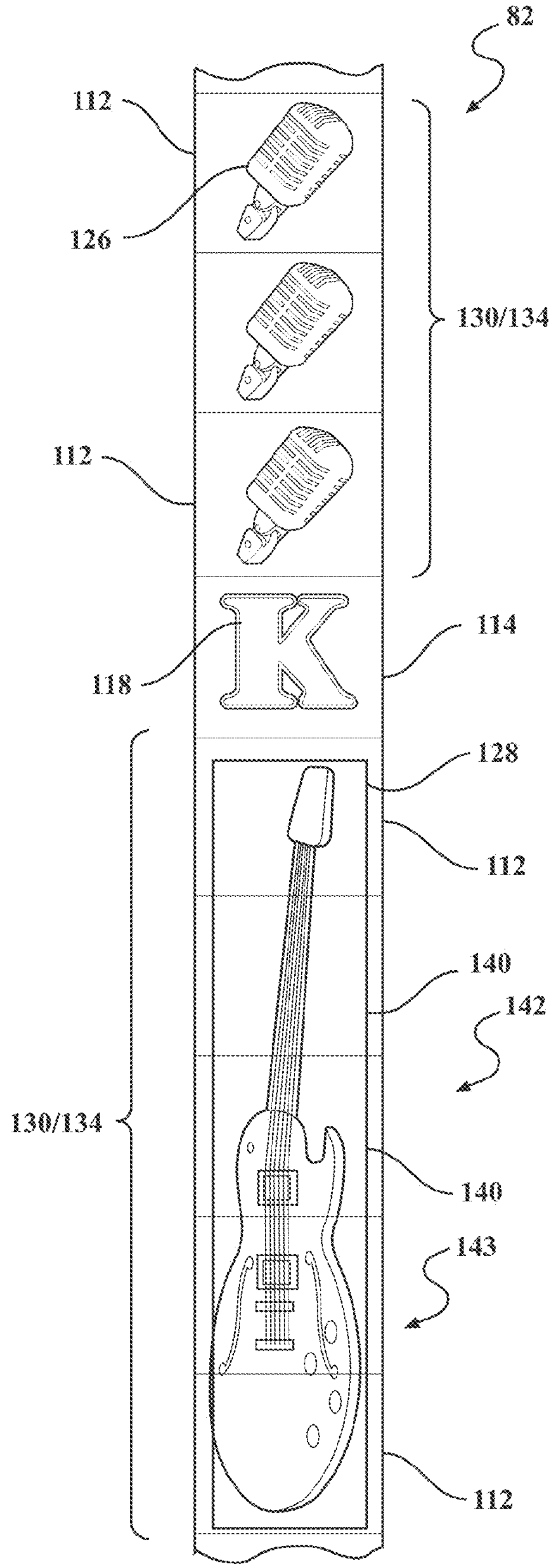
FIG. 8 is another schematic representation of the slot reel shown in FIG. 5, according to an embodiment of the present invention.

FIG. 3 is an exemplary graphical display of a game 80 that is displayed by the gaming machine 10 shown in FIG. 1. FIG. 4 is a schematic representation of a portion of the gaming machine 10 including the game 80. FIGS. 5, 6, and 8 are schematic representations of a slot reel 82 that may be used with the gaming machine 10. FIG. 7 is a schematic representation of two slot reels 82 that may be used with the gaming machine 10. In the illustrated embodiment, the gaming controller 16 is configured to display the game 80 on the display device 12. In one embodiment, the game 80 is a video slot game. However, it should be noted that the game 80 may be any type of game upon which a player could make a wager including, but not limited to a keno game, a blackjack game, a video poker game, or any type of game that enables the gaming machine 10 to function as described herein. In the illustrated embodiment, the game 80 is displayed on the first display 54. Alternatively, the game 80 may be displayed on the first display 54 and/or the second display 56.

In general, during play of the game 80, the gaming controller 16 randomly generates an outcome 84 of the game 80 and displays the generated game outcome 84 in a display area 86. The gaming controller 16 randomly selects a plurality of game symbols 88 from a predefined set of possible game symbols and displays the selected game symbols 88 associated with the generated game outcome 84 in the game display area 86.

In the illustrated embodiment, the plurality of symbols 88 are displayed in a grid 90 having a plurality of cells 92 arranged along a plurality of rows 94 and a plurality of columns 96. Each cell 92 displays one or more game symbols 88 associated with the game outcome 84. In the illustrated embodiment, the gaming controller 16 displays the game symbols 88 within a plurality of reels 82. Each reel 82 is associated with a corresponding column 96. The game 80, in one embodiment, includes 5 reels 82 with 3 cells 92 displayed in the display area 86 per reel 82 (a "3×5" arrangement). Alternatively, other reel arrangements may be used such as, for example, 4, 5, 5, 5, and 4 cells per reel, respectively (a "4-5-5-5-4" arrangement), 3-4-3-4-3, or 4-5-4-5-4 arrangements or arrangements with the same number of cells per column, such as 3×3, 3×4, 4×5, or 5×5 configurations. The game 80 also includes a plurality of paylines 98 that extend across one or more cells 92 to indicate, to the player, a combination of game symbols 88. In one embodiment, the gaming machine 10 displays the game 80 via a plurality of mechanical reels (not shown) that include a plurality of symbols displayed on a circumferential surface of each reel.

Each slot game is generally played in a conventional manner. The player makes a wager, which may be based on a predetermined denomination and a selected number of paylines, the gaming controller 16 randomly generates an outcome for the game, spins the reels, and selectively stops the reels to display a game symbol 88 in each of the display cells 92. If a predetermined pattern of symbols 88 are randomly chosen for each cell 92 on a played payline 98, the player may be awarded a payout based on the payline, the wager, and a predetermined paytable. Moreover, the player may be awarded a payout if the combination of symbols associated with a selected payline is a winning combination. In addition, a player may receive a bonus feature and/or a bonus game based on the combination of symbols associated with the selected payline and/or the appearance of one or more predefined symbols in the game outcome 84. Many variations to the above described general play of a slot game fall within the scope of the present invention. Such slot games are well-known in the art, and are therefore not further discussed.

In the illustrated embodiment, the gaming machine 10 receives a signal, from the user input device 14, that is indicative of a player's selection to initiate a gaming session including a wager amount, and a selection of one or more paylines 98 associated with a predefined set of cells 92 within the displayed grid 90. In the illustrated embodiment, the gaming machine 10 is a multi-line game, i.e., the paylines include horizontal paylines and/or diagonal pay-lines, and/or zig-zag paylines. Moreover, the user input device 14 may allow the player to toggle to increase the bet per payline a credit at a time (up to the maximum bet). The gaming controller 16 randomly generates an outcome of the game 80, and displays the generated outcome on the display device 12. In one embodiment, the gaming controller 16 is configured to rotate, and/or spin each reel 82 to initiate a game play, and stop each reel 82 to display a plurality of symbols 88 associated with the randomly generated outcome. In addition, the gaming controller 16 is adapted to determine if the generated outcome is a winning outcome based on the displayed game symbols 88, a pay-table, a wager, and one or more selected paylines 98. More specifically, the gaming machine 10 determines if a combination of symbols 88 arranged along the selected payline 98 is a winning combination. The gaming controller 16 may provide an award in response to the outcome of the game 80. In general, the term "award" may be a payout, in terms of credits or money. Thus, gaming controller 16 may award a regular payout in response to the outcome of the primary game 80. However, it should be noted that the term award may also refer to other types of awards, including, prizes, e.g., meals, show tickets, etc. . . . , as well as in-game award, such as free games or awarding the player one or more wild symbols or stacked wild symbols in each of the games.

In the illustrated embodiment, the gaming controller 16 is configured to display the game 80 including a plurality of reels 82. For example, in one embodiment, the gaming controller 16 displays the game 80 having five reels 82 orientated horizontally and including a $1^{st}$ reel 100, a $2^{nd}$ reel 102, a $3^{rd}$ reel 104, a $4^{th}$ reel 106, and a $5^{th}$ reel 108. Each reel 82 includes a plurality of symbol positions 110. During display of the generated game outcome 84, the gaming controller 16 selects a plurality of game symbols 88 being displayed in each of the symbol positions 110, and spins each reel 82 such that the game symbols 88 are moved through each of the cells 92 in the display area 86.

The gaming controller 16 displays at least one reel 82 having a plurality of symbol positions 110 including a plurality of special symbol positions 112 and a plurality of normal symbol positions 114. In the illustrated embodiment, the gaming controller 16 randomly selects at least one special symbol 116 from a predefined set of special symbols 116, and displays the selected special symbol 116 in each special symbol position 112 such that each special symbol position 112 includes the selected special symbol 116. In the illustrated embodiment, the gaming controller 16 displays the same special symbol 116 in each special symbol position 112. Alternatively, the gaming controller 16 may select a plurality of similar special symbols and/or a plurality of associated special symbols such as, for example, a set of special symbols included in a category of special symbols. For example, the predefined set of special symbols may include, but is not limited to, a category of special symbols such as, for example, shapes, colors, sounds, items, characters, backgrounds, frames, and/or any category of special symbols that enable the gaming controller 16 to function as described herein. Each special symbol category includes a plurality of special symbols having predefined characteristics associated with the special symbol category. For example, the predefined set of special symbols may include a shape category that includes a plurality of special symbols that each have a shape associated with the shape category. The gaming controller 16 may select one or more special symbols indicative of the shapes within the shape category, and display the selected special symbols in each of the special symbol positions 112.

In the illustrated embodiment, each reel 82 includes a plurality of static normal symbols 118 that are displayed in each corresponding normal symbol positions 114, such that the same normal symbol 118 is displayed in the corresponding normal symbol position 114 in each game outcome 84. Alternatively, the gaming controller 16 may randomly select a plurality of normal symbols 118 from a predefined set of normal symbols 118, and display the selected normal symbols 118 within each of the normal symbol positions 114 such that, for each game outcome 84, each normal symbol position 114 may display a different normal symbol 118. In one embodiment, the predefined set of normal symbols 118 includes any game symbol not included in the predefined set of special symbols 116.

In the illustrated embodiment, during display of the generated outcome 84 of the game 80, the gaming controller 16 randomly determines a number 120 of special symbol positions 112 to be displayed on at least one reel 82 such as, for example, the first reel 100, and spins and stops the first reel 100 to display the generated game outcome 84 within the display area 86 including the determined selected number 120 of special symbol positions 112. In the illustrated embodiment, the gaming machine 10 also randomly selects at least one special symbol 116 from the predefined set of special symbols 116, and displays the first reel 100 including the selected special symbol 116 displayed in each special symbol position 112 of the determined number 120 of special symbol positions 112.

In the illustrated embodiment, each reel 82 includes a predefined total number 122 of symbol positions 110 including a plurality of special symbol positions 112 and a plurality of normal symbol positions 114. The gaming machine 10 randomly selects a number 120 of special symbol positions 112 being displayed on the first reel 100. The gaming machine 10 also determines a number 124 of normal symbol positions 114 being displayed in the first reel 100 based at least in part on the selected number 120 of special symbol positions 112 and the predefined total number 122 of symbol positions 110. The gaming controller 16 displays the first reel 100 including the determined number 124 of normal symbol positions 114 and the selected number 120 of special symbol positions 112 such that the sum of the displayed number 120 of special symbol positions 112 and the displayed number 124 of normal symbol positions 114 is equal to the predefined total number 122 of symbol positions 110. For example, the first reel 100 may include a predefined total number of symbol positions 110 equal to 100. The gaming controller may randomly select 80 special symbol positions 112 being displayed on the first reel 100, and determine the number of normal symbol positions 114 being displayed equal to 20 normal symbol positions 114, such that the sum of 80 displayed special symbol positions 112 and 20 displayed normal symbol positions 114 equals the predefined 100 symbol positions 110 displayed on the first reel 100.

In another embodiment, the gaming machine 10 includes a predefined number 124 of normal symbol positions 114 and randomly selects a number 120 of special symbol positions 112. The gaming machine 10 also displays the first reel 100 having a total number of symbol positions 110 equal to the sum of the predefined number 124 of normal symbol positions 114 and the selected number 120 of special symbol positions 112. For example, the first reel 100 may include a predefined number of normal symbol positions 114 equal to 40 symbol positions 110. The gaming controller 16 may randomly select 80 special symbol positions 112 being displayed on the first reel 100. The gaming controller 16 displays the first reel 100 having 120 symbol positions 110 that is equal to the sum of the 80 predefined normal symbol positions 114 and the 40 selected special symbol positions 112.

In another embodiment, the gaming controller 16 determines a total number 122 of symbol positions 110 being displayed in the first reel 100 and randomly selects a percentage of the determined total number 122 of symbol positions 110 including a special symbol position 112. The gaming controller 16 calculates the number 120 of special symbol positions 112 being displayed in the first reel 100 based at least in part on the determined total number 122 of symbol positions 110 and the selected percentage of special symbol positions 112. The gaming controller 16 also determines the number 124 of normal symbol positions 114 being displayed in the first reel 100 based on the total number 122 of symbol positions 110 and the determined number 120 of special symbol positions 112, and displays the first reel 100 including the determined number 120 of special symbol positions 112 and the determined number of normal symbol positions 114.

For example, the gaming controller 16 may determine the total number 122 of symbol positions 110 displayed in the first reel 100 equal to 100 symbol positions 110. The gaming controller 16 randomly selects a percentage of special symbol positions 112 equal to 80% of the determined 100 symbol positions 110, and determines the number 120 of special symbol positions 112 being displayed on the first reel 100 equal to 80 special symbol positions 112. The gaming controller 16 also determines the number 124 of normal symbol positions 114 to be 20 normal symbol positions 114 such that the sum of the 20 normal symbol positions 114 and the 80 special symbol positions 112 equals the total 100 symbol positions 110 being displayed on the first reel 100.

In one embodiment, each special symbol 116 includes an associated symbol value. For example, the plurality of special symbols 116 may include a first special symbol 126 having a first symbol value and a second special symbol 128 having a second symbol value that is different than the first symbol value. Moreover, the gaming controller 16 may provide an first award indicative a first award value for achieving a winning combination having the first special symbol 126, and provide a second award indicative of a second award value for achieving a winning combination that includes the second special symbol 128, wherein the first award value is different than the second award value. In addition, the gaming controller 16 randomly selects a special symbol 116 having an associated symbol value and selects the number 120 of special symbol positions 112 being displayed in the first reel 100 based at least in part on the symbol value associated with the selected special symbol 116.

In the illustrated embodiment, the gaming controller 16 randomly selects a number 120 of special symbol positions 112 and displays the selected number 120 of special symbol positions 112 including at least one run 130 of consecutive special symbol positions 112 that include a plurality of adjacent special symbol positions 112. The gaming controller 16 also randomly selects a special symbol 116 being displayed in each special symbol position 112 of the run 130 of consecutive special symbol positions 112 such that each adjacent special symbol position 112 includes the selected special symbol 116. Additional details of adjacent special symbol positions, which may be used in the present invention, are described in U.S. patent application Ser. No. 11/299,009 to Yoshimi, now U.S. Pat. No. 8,096,869, filed Dec. 9, 2005, titled "Gaming Machine with Runs of Consecutive Identical Symbols", which is incorporated herein by reference.

Referring to FIG. 6, in one embodiment, the gaming controller 16 displays the selected number 120 of special symbol positions 112 including a plurality of runs 130 of consecutive special symbol positions 112. Moreover, the gaming machine 10 randomly selects a number of runs 130 of adjacent special symbol positions 112 and displays the first reel 100 including the selected number of runs 130. For example, the gaming controller 16 may select two runs 130 of adjacent special symbol positions 112, as is shown in FIG. 6. In one embodiment, the gaming controller 16 randomly selects a special symbol 116 and displays the selected special symbol 116 in each special symbol position 112 of the selected number of runs 130. Moreover, the gaming controller 16 displays at least one normal symbol position 114 between two of the runs 130 of adjacent special symbol positions 112.

Alternatively, the gaming controller 16 randomly selects a plurality of special symbols 116 associated with the runs 130 being displayed in the first reel 100 and displays a corresponding selected special symbol 116 in each special symbol position 112 of the associated runs 130. For example, in one embodiment, the gaming controller 16 displays the selected number of special symbol positions 112 including a first group 132 of adjacent special symbol positions 112 and a second group 134 of special symbol positions 112, as shown in FIG. 6 and FIG. 8. The gaming controller 16 also selects a first special symbol 126 and a second special symbol 128. The gaming controller 16 displays the first group 132 having the first special symbol 126 within each special symbol position 112 of the first group 132 and displays the second group 134 having the second special symbol 128 within each special symbol position 112 of the second group 134. In one embodiment, the first special symbol 126 and the second special symbol 128 are different. In another embodiment, the first special symbol 126 and the second special symbol 128 are similar. Moreover, the first and second special symbols 126 and 128 may be the same special symbol. In addition, the first and second special symbols 126 and 128 may be selected from the same category of special symbols and/or be selected from different categories of special symbols.

Referring to FIGS. 4 and 7, in the illustrated embodiment, the gaming controller 16 displays the game 80 including a plurality of reels 82 and, for each reel 82, randomly determines a number of special symbol positions 112 being displayed in each reel 82. In one embodiment, the gaming controller 16 displays the game 80 including the first reel 100 and a second reel 102, randomly selects a first number 136 of special symbol positions 112 being displayed in the first reel 100 and randomly selects a second number 138 of special symbol positions 112 being displayed in the second reel 102. The gaming controller 16 also displays the first reel 100 including the determined first number 136 of special symbol positions 112 and displays the second reel 102 including the determined second number 138 of special symbol positions 112. In one embodiment, the first number 136 of special symbol positions is approximately equal to the second number 138 of special symbol positions 112. Alternatively, the first number 136 of special symbol positions 112 may be less than, or greater than the second number 138 of special symbol positions 112.

In the illustrated embodiment, the gaming controller 16 also randomly selects a special symbol 116 that is displayed in each special symbol position 112 displayed on the first and second reels 100 and 102. In another embodiment, the gaming controller 16 randomly selects a first special symbol 126 being displayed on the first reel 100 and randomly selects a second special symbol 128 being displayed on the second reel 102, wherein the first special symbol 126 is different than the second special symbol 128. In other embodiments, the first and second special symbols 126 and 128 may be similar, may be selected from the same special symbol category, and/or may be selected from different special symbol categories.

Referring to FIGS. 4 and 8, in the illustrated embodiment, the gaming controller 16 displays the game 80 including a special symbol 116 having a plurality of symbol images 140 such that a plurality of adjacent special symbols 116 are displayed as a unitary image 142 that extends across the plurality of special symbol positions 112. For example, as shown in FIG. 8, the gaming controller 16 randomly selects a number 120 of special symbol positions 112 including at least one run 130 of consecutive special symbol positions 112 being displayed on the reel 82. The gaming controller 16 randomly selects a special symbol 116 being displayed in each special symbol position 112 of the run 130, wherein the selected special symbol 116 includes a plurality of symbol images 140. Each selected special symbol 116 being displayed in each of the adjacent special symbol positions 112 includes a different symbol image 140 such that a unitary symbol image 142 extends across each adjacent special symbol position 112. For example, as shown in FIG. 8, the gaming controller 16 displays each selected special symbol 116 having a different symbol image 140 such that a unitary guitar image 143 is displayed across each adjacent special symbol position 112.

In another embodiment, the gaming controller 16 selects a plurality of special symbols 116 from the same category of special symbols, wherein each selected special symbol 116 forms a portion of the unitary symbol image 142 such that when the selected special symbols 116 are displayed in each adjacent special symbol position 112, the unitary symbol image 142 is displayed across the adjacent special symbol positions 112.

In the illustrated embodiment, the gaming controller 16 displays the game 80 including a plurality of reel sets 144. Each reel set 144 includes a plurality of sets 146 of special symbol positions 112. Each special symbol position set 146 is associated with a corresponding reel 82 and includes a predefined number 120 of special symbol positions 112 being displayed on the corresponding reel 82. The gaming controller 16 randomly selects a reel set 144 being displayed in the game 80 and displays each reel 82 including the associated special symbol set 146 such that each reel 82 displays the corresponding number 120 of special symbol positions 112 associated the selected reel set 144. In one embodiment, the gaming controller 16 displays the game 80 including at least one reel set 144 that includes a first special symbol position set having a first number of special symbol positions 112 and a second special symbol position set having a second number of special symbol positions 112 that is different than the first number of special symbol positions 112.

For example, the number of reel sets displayed in the game 80 may be provided as in the following chart, including the special symbol position sets 146 included in each reel set 144 and the number 120 of special symbol positions 112 included in each special symbol position set 146.

| | Reel | Number of Special Symbol Positions included in Each Reel | | | | |
|---|---|---|---|---|---|---|
| $P_{(R)}$ | Set | Reel 1 | Reel 2 | Reel 3 | Reel 4 | Reel 5 |
| 10 | A | 80 | 80 | 10 | 80 | 80 |
| 5 | B | 80 | 80 | 80 | 80 | 10 |
| 10 | C | 80 | 10 | 80 | 10 | 80 |
| 5 | D | 80 | 80 | 80 | 80 | 80 |
| 50 | E | 10 | 10 | 10 | 10 | 10 |
| 20 | F | 50 | 80 | 50 | 10 | 80 |

The first column represents the probability of occurrence, $P_{(R)}$ associated with each reel set. The second column represents each reel set 144. The third column represents the special symbol position set associated with the $1^{st}$ reel including the number of special symbol positions being displayed on the $1^{st}$ reel. The fourth column represents the special symbol position set associated with the $2^{nd}$ reel including the number of special symbol positions being displayed on the $2^{nd}$ reel. The fifth, sixth, and seventh columns represent the special symbol position sets associated with the $3^{rd}$, $4^{th}$, and $5^{th}$, reels respectively.

In the illustrated embodiment, during each play of game 80, the gaming controller 16 randomly selects a reel set based on the probabilities assigned to each set as shown in the first column. For example, if the gaming controller 16 randomly selects reel set "C" based on the associated probability of occurrence, the gaming controller 16 displays the game 80 including 80 special symbol positions 112 being displayed in the $1^{st}$ reel, 10 special symbol positions being displayed in the $2^{nd}$ reel, 80 special symbol positions being displays in the $3^{rd}$ reel, 10 special symbol positions being displayed in the $4^{th}$ reel, and 80 special symbol positions being displayed in the $5^{th}$ reel.

In one embodiment, each special symbol position set 146 includes a percentage of special symbol positions 112 being displayed in each associated reel 82. For example, the percentage of special symbol positions associated with each special symbol position set 146 may be provided as in the following chart.

| | Reel | Percentage of Symbol Positions included in Each Reel | | | | |
|---|---|---|---|---|---|---|
| $P_{(R)}$ | Set | Reel 1 | Reel 2 | Reel 3 | Reel 4 | Reel 5 |
| 10 | A | 10% | 10% | 80% | 80% | 80% |
| 10 | B | 80% | 80% | 10% | 10% | 10% |
| 50 | C | 80% | 80% | 10% | 80% | 80% |
| 5 | D | 50% | 50% | 20% | 50% | 50% |
| 20 | E | 50% | 50% | 50% | 50% | 50% |
| 5 | F | 80% | 80% | 80% | 80% | 80% |

The first column represents the probability of occurrence, $P_{(R)}$ associated with each reel set. The second column represents each reel set 144. The third, fourth, fifth, sixth, and seventh columns represent the percentage of special symbol positions 112 being displayed in each reel 82 for each reel set 144, respectively. In the illustrated embodiment, during each play of game 80, the gaming controller 16 randomly selects a reel set based on the probabilities assigned to each set as shown in the first column and determines the number of special symbol position displayed in each reel 82 based on the percentage of special symbol positions associated with each reel and included in selected reel set. For example, the gaming controller 16 may determine the total number of symbol positions displayed in each reel being equal to 50 symbol positions. If the gaming controller 16 randomly selects reel set "A" based on the associated probability of occurrence, the gaming controller 16 displays the game 80 including 5 special symbol positions 112 being displayed in the $1^{st}$ reel, 5 special symbol positions being displayed in the $2^{nd}$ reel, 40 special symbol positions being displays in the $3^{rd}$ reel, 40 special symbol positions being displayed in the $4^{th}$ reel, and 40 special symbol positions being displayed in the $5^{th}$ reel. In one embodiment, the total number of symbol positions 110 displayed in each reel 82 is approximately equal. In another embodiment, the gaming controller 16 randomly selects a total number of symbol positions 110 being displayed in each reel 82, respectively, such that the total number of symbol positions 110 displayed in the $1^{st}$ reel may be different than the total number of symbol positions 110 being displayed in the $2^{nd}$ reel.

Figure 9:
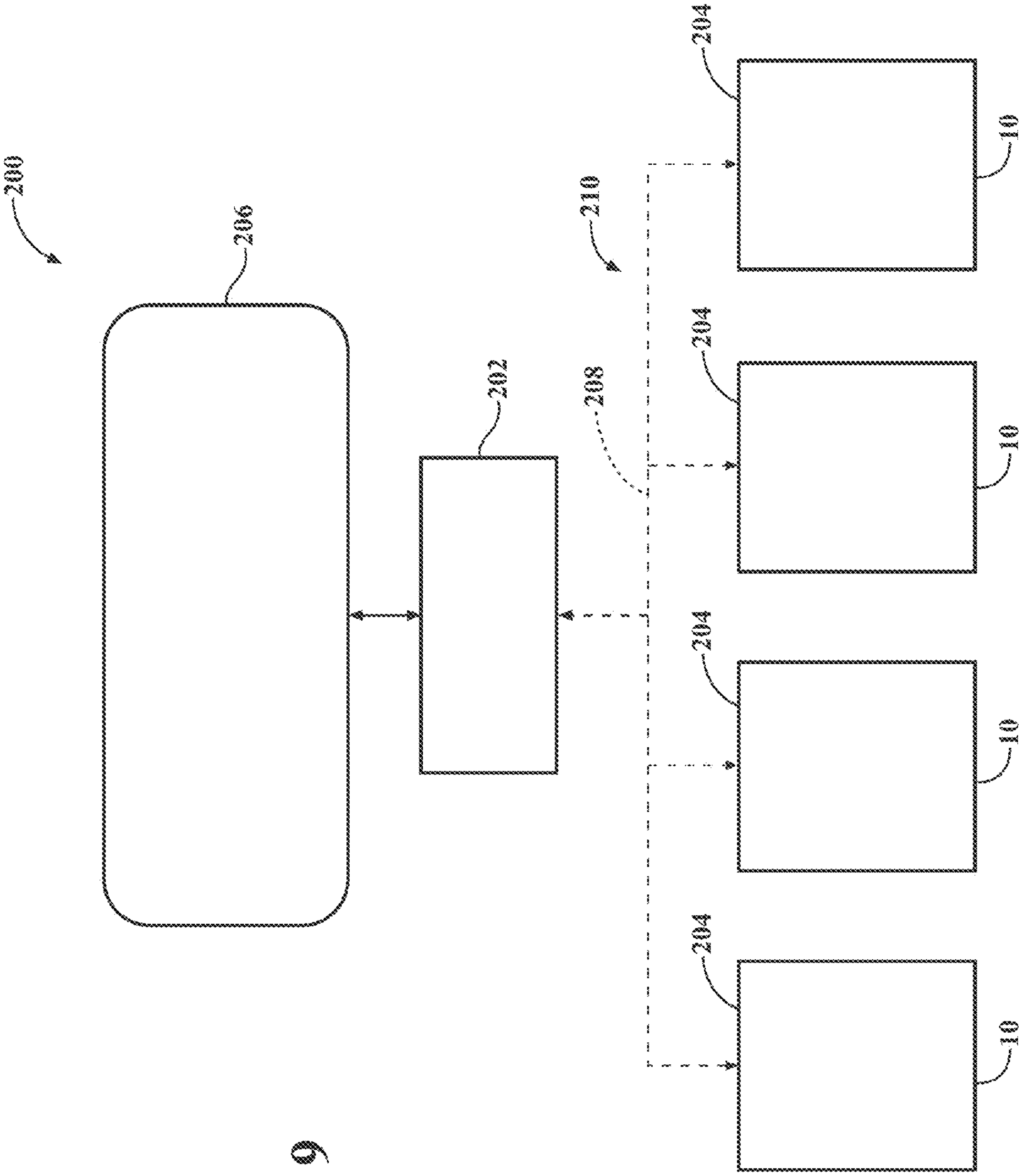
FIG. 9 is a schematic view of an exemplary gaming system of the present invention.

FIG. 9 is a schematic view of an exemplary gaming system 200. The gaming system 200 includes a system controller 202 and one or more gaming terminals 204 that are coupled to the system controller 202. The gaming system 200 may also include a central display 206 that is coupled to the system controller 202 for displaying games played on one or more of the gaming machines 10. In one embodiment, the gaming terminal 204 includes the gaming machine 10. In another embodiment, gaming terminal 204 may include a personal computer, laptop, cell phone, smartphone, tablet computer, personal data assistant, and/or any suitable computing device that enables a player to connect to system controller 202 to play the game 80.

In the illustrated embodiment, the gaming machines 10 and the system controller 202 are coupled in communication with a local area network (LAN) 208. Alternatively, the gaming machines 10 and the system controller 202 may be coupled via a network such as, for example, an Internet link, an intranet, a WAN, dial-in-connections, cable modems, wireless modems, and/or ISDN lines. In the illustrated embodiment, the gaming system 200 includes four gaming machines 10, which in one embodiment as shown in FIG. 9 are arranged in a bank 210, i.e., are arranged together, adjacently. It should be noted, however, that the gaming system 200 may include any number of gaming machines 10 that may be arranged in any manner, such as in a circle or along a curved arc, or positioned within separate areas of a casino floor, and/or separate gaming establishments such as different casinos. Furthermore, additional groups of gaming machines 10 may be coupled to the system controller 202. In one embodiment, the system controller 202 may be implemented by one of the gaming controllers 16 associated with a gaming machine 10. In still another embodiment, the system controller 202 may be located remotely with respect to gaming machines 10, or within one of the gaming machine cabinet assemblies 18 (shown in FIG. 1). The system controller 202 is configured to perform all of the functions of the gaming controller 16 as described herein.

In the illustrated embodiment, the system controller 202 determines if a triggering event occurs in a game outcome being played at one or more of the gaming machines 10, and displays a bonus game such as, for example, the game 80 on the central display 206 if the triggering event occurs. Alternatively, the system controller 202 may display the game 80 at one or more gaming machines 10 based on one or more triggering events occurring in games played at the gaming machines 10. The triggering event may be the appearance of a predefined symbol and/or a predefined symbol combination in a game outcome.

Referring to FIGS. 9 and 4, during play of the bonus game 80, the system controller 202 determines a number of game outcomes, i.e., free spins that will be displayed based at least in part on the triggering event. The system controller 202 displays, for each bonus game 80, at least one reel 82 having a plurality of symbol positions 110 that includes a plurality of special symbol positions 112 and a plurality of normal symbol positions 114, randomly selects at least one special symbol 116 from a plurality of special symbols 116, and displays the selected special symbol 116 in each special symbol position 112 such that each special symbol position 112 includes the selected special symbol 116.

Figure 10:
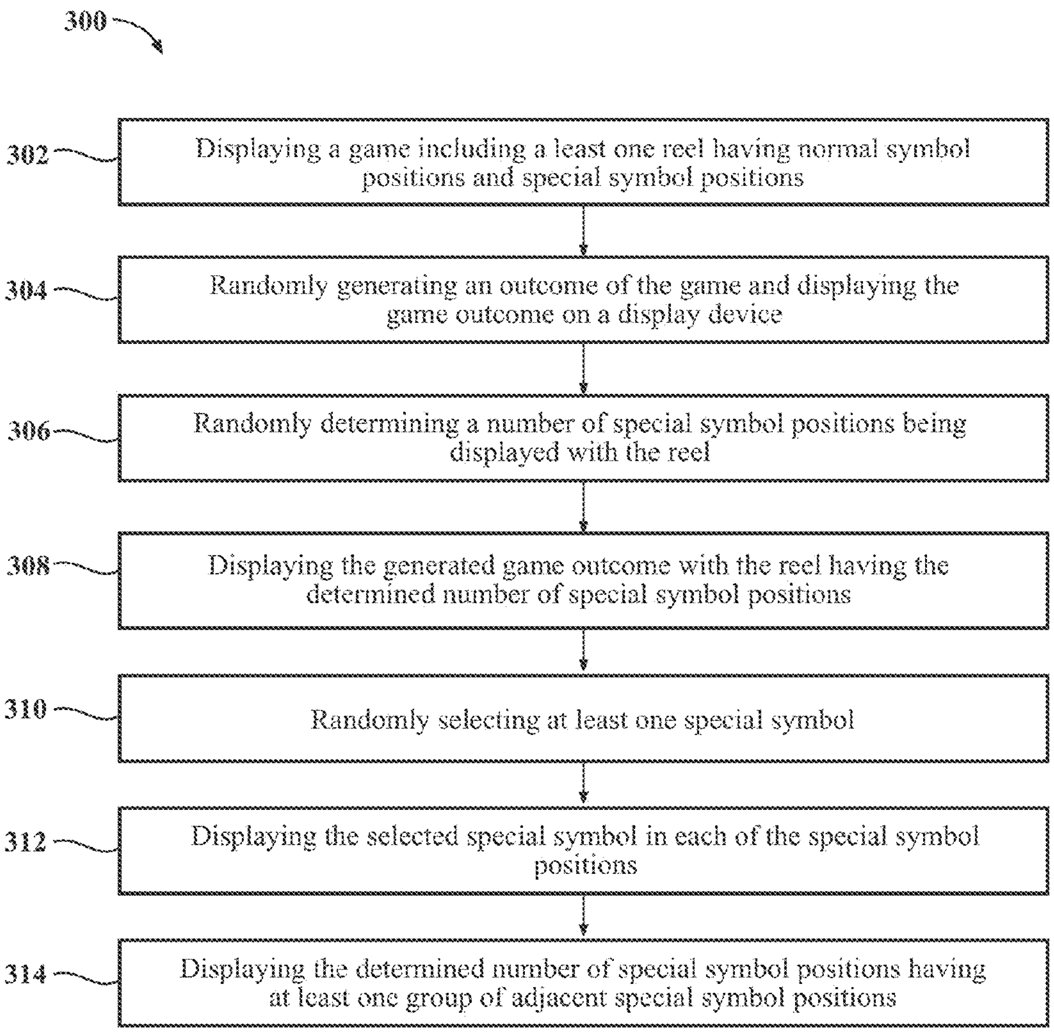
FIG. 10 is a flowchart of an exemplary method of allowing a player to play a gaming machine, according to an embodiment of the present invention.

FIG. 10 is a flowchart of an exemplary method of allowing a player to play the gaming machine 10. In the illustrated embodiment, the method 300 includes displaying 302 the game 80 including at least one reel 82, wherein the at least one reel 82 includes a plurality of symbol positions 110 including a plurality of normal symbols positions 114 and a plurality of special symbol positions 112. The method 300 also includes randomly generating 304 an outcome 84 of a game and displaying the game outcome on the display device, randomly determining 306 a number of special symbol positions being displayed on the at least one reel, and displaying 308 the generated game outcome with the at least one reel including the determined number of special symbol positions. The method 300 also includes randomly selecting 310 at least one special symbol from a plurality of special symbols, and displaying 312 the selected special symbol in each of the special symbol positions. In one embodiment, the method also includes displaying 314 the determined number of special symbol positions having at least one run of consecutive special symbol positions.

Figure 11:
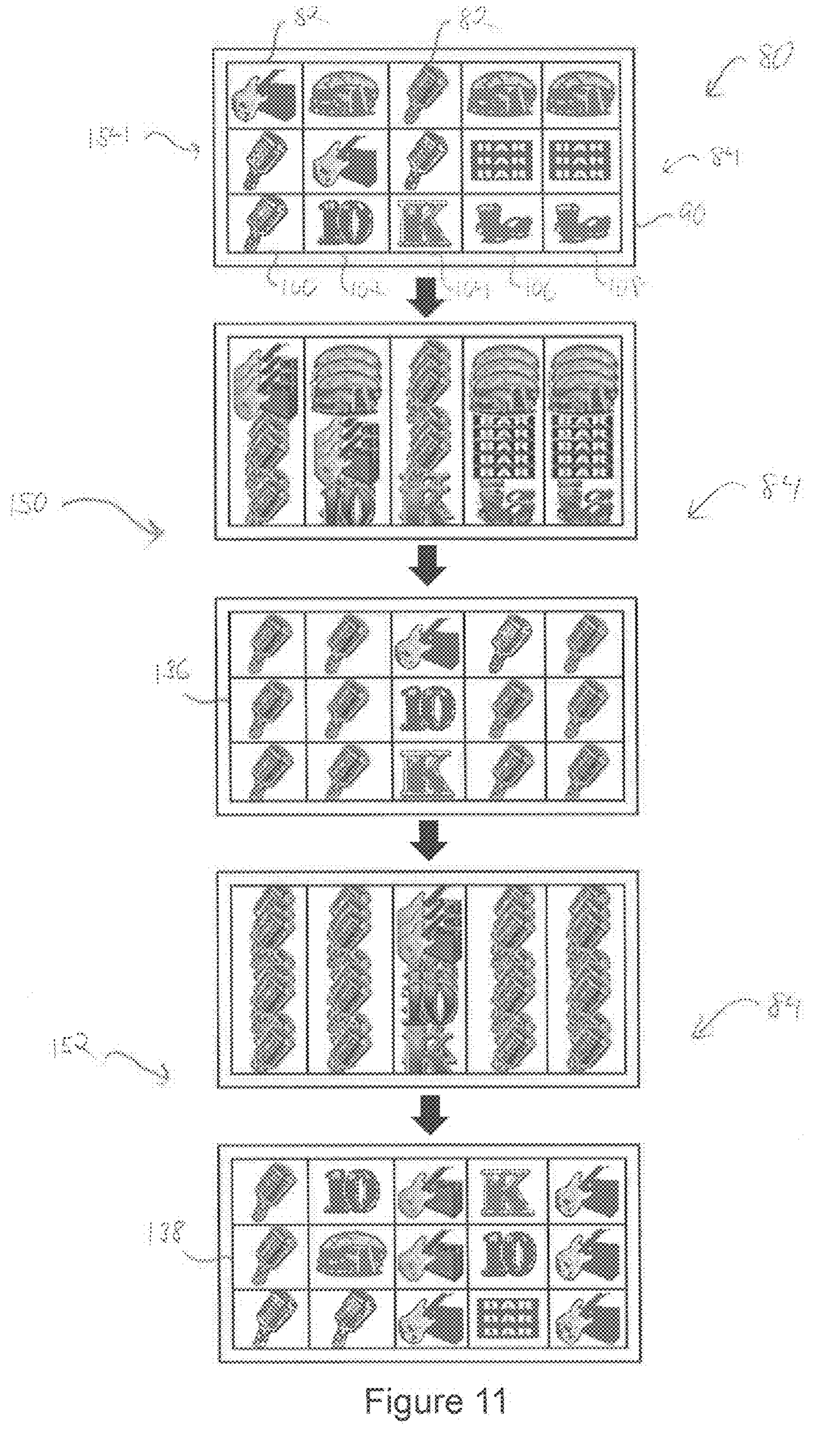
FIG. 11 is series of graphical displays of the slot game shown in FIG. 3, including a first instance of the game and a second instance of the game, according to an embodiment of the present invention.
Figure 12:
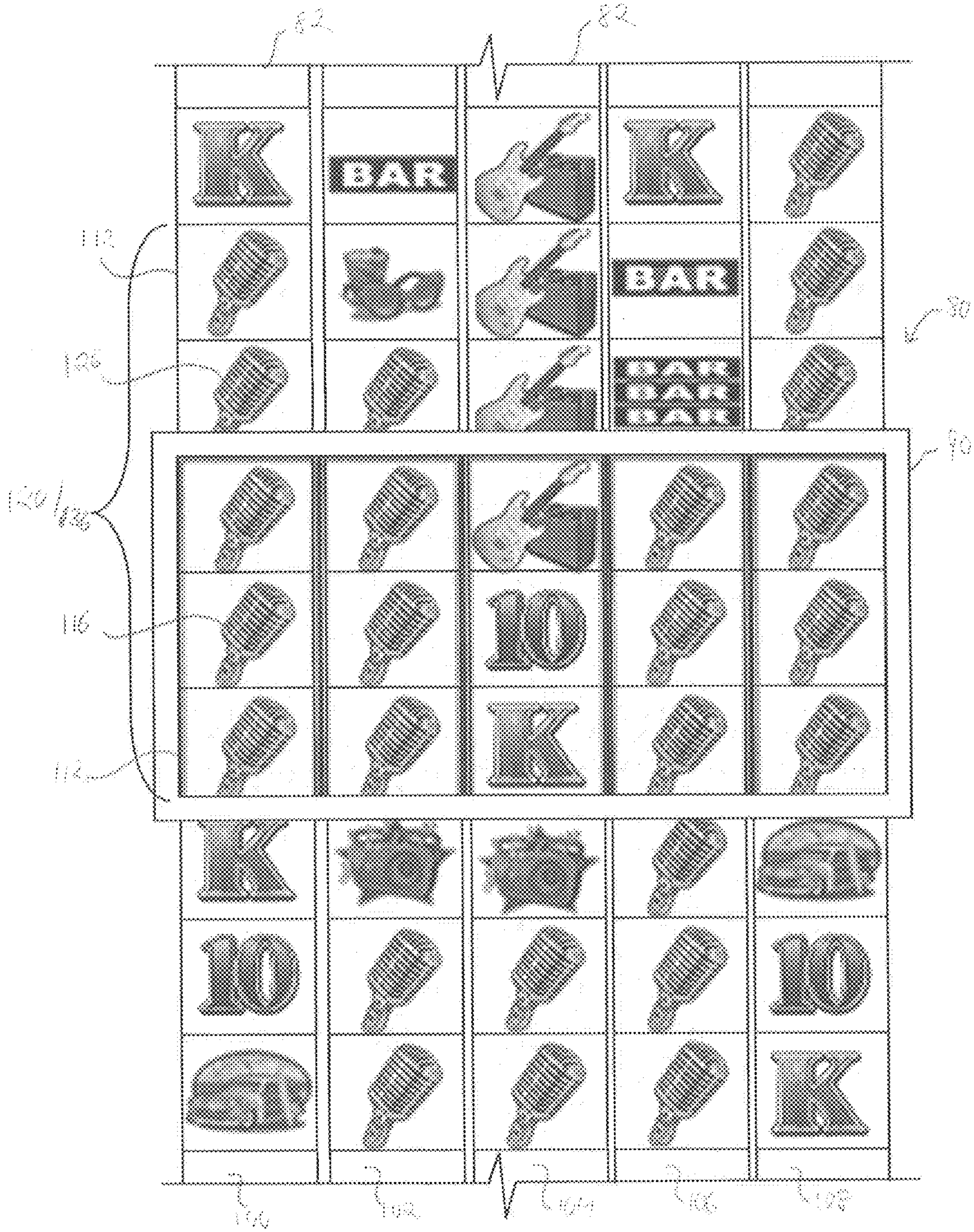
FIG. 12 is a schematic representation of a portion of the gaming machine shown in FIG. 1 including the game of FIG. 3 illustrating a plurality of slot reels being displayed in with the first instance of the game shown in FIG. 11, according to an embodiment of the present invention.
Figure 13:
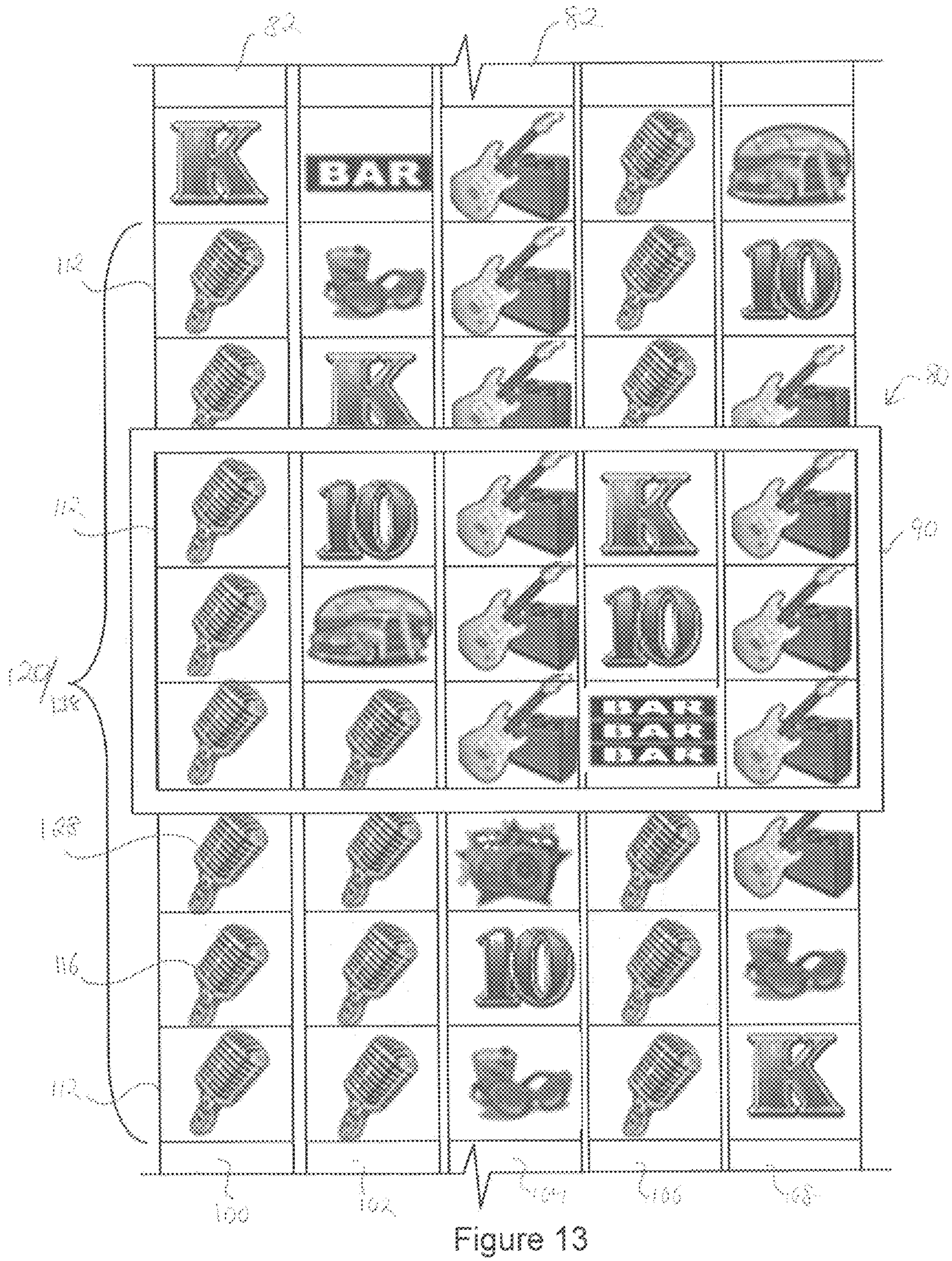
FIG. 13 is a schematic representation of a portion of the gaming machine shown in FIG. 1 including the game of FIG. 3 illustrating a plurality of slot reels being displayed in with the second instance of the game shown in FIG. 11, according to an embodiment of the present invention.

FIG. 11 is series of graphical displays of the slot game 80 including a first instance of the game and a second instance of the game, according to an embodiment of the present invention. FIG. 12 is a schematic representation of the first instance of the game 80 including at least one reel 82 being displayed with a first amount of special symbol positions 112. FIG. 13 is a schematic representation of the second instance of the game 80 including at least one reel 82 being displayed with a second amount of special symbol positions 112.

In the illustrated embodiment, the gaming controller 16 is configured to display the game 80 including a plurality of game instances, i.e. game outcomes 84. For example, in one embodiment, the gaming controller 16 receives a signal indicative of a wager from a player and responsively initiates an outcome 84 of the game 80 including randomly determining an outcome of the game, spinning and stopping the reels 82 to display the game outcome, and providing an award as a function of the outcome. Moreover, the gaming controller 16 may provide the player an award as a function a winning combination of symbols being displayed along a selected payline in the game outcome.

The gaming controller 16 allows the player to a play a plurality of game instances 84. For each game outcome 84, the gaming controller 16 determines an amount 120 of special symbol positions 112 being displayed with at least one reel 82, and displays the game outcome 84 including the reel 82 being displayed with the determined amount 120 of special symbol positions 112. In addition, the gaming controller 16 randomly selects a special symbol 116 being displayed in each of the special symbol positions 112 and spins and stops the reel 82 to display the game outcome 84 including the determined amount 120 of special symbol positions 112 being displayed on the reel 82.

In the illustrated embodiment, the gaming controller 16 increases the amount of special symbol positions 112 being displayed with the reel 82 during each subsequent outcome 84 of the game 80. For example, the gaming controller 16 may receive a wager from a player and initiate a first instance 150 of the game 80 in response to the received wager. The gaming controller 16 determines an outcome of the first instance 150 and determines a first amount 136 of special symbol positions 112 to be displayed with at least one reel 82. In the illustrated embodiment, the first amount 136 is equal to a predefined amount of special symbol positions 112. In another embodiment, the gaming controller 16 may randomly select the first amount 136 of special symbol positions 112.

For example, in the illustrated embodiment, the gaming controller 16 may display the first reel 100 with the first amount 136 of special symbol positions 112. The gaming controller 16 displays the first instance 150 by spinning and stopping the reels 82 including the first reel 100 being displayed with the first amount 136 of special symbol positions 112. In one embodiment, the gaming controller 16 spins the first reel 100 such that the first amount 136 of special symbol positions 112 is displayed to the player on the display device. More specifically, as the first reel 100 is spun, each of the first amount 136 of special symbol positions 112 is moved through the display grid 90 to notify the player of the amount of special symbol positions 112 being displayed with the reel 82 to increase the player's expectation of a winning outcome.

Subsequently, the gaming controller 16 initiates a second instance 152 of the game 80 and determines a second amount 138 of special symbol positions 112 to be displayed with the first reel 100 that is different than the first amount 136 of special symbol positions 112. The gaming controller 16 displays the first reel 100 with the second amount 138 of special symbol positions 112, and spins and stops the reels 82 to display the outcome of the second instance 152. Similar to the first instance 150, during the second instance 152, the gaming controller 16 spins the first reel 100 such that the second amount 138 of special symbol positions 112 is moved through the display grid 90 to notify the player that the amount of special symbol positions 112 being displayed with the first reel 100 has changed during the second instance 152. In the illustrated embodiment, the second amount 138 of special symbol positions 112 is larger than the first amount 136 of special symbol positions 112. By increasing the amount of special symbols 116 during subsequent instances of the game 80, the gaming controller 16 increases the player's opportunity of obtaining a winning combination of symbols in each subsequent game outcome. In another embodiment, the second amount 138 of special symbol positions 112 may be less than the first amount 136 of special symbol positions 112.

In addition, the gaming controller 16 may initiate a third instance (not shown) of the game 80 and determine a third amount of special symbol positions 112 to be displayed with the first reel 100 during the third instance. The third amount may be different than the first amount 136 and the second amount 138. Similar to the first and second instances 150 and 152, the gaming controller 16 displays the first reel 100 with the third amount and spins and stops the first reel 100 to display the third instance. During the third instance, the gaming controller 16 spins the first reel 100 such that the third amount of special symbol positions 112 is moved through the display grid 90 to notify the player that the amount of special symbol positions 112 being displayed with the first reel 100 has increased during the third instance.

In one embodiment, the gaming controller 16 may increase the amount of special symbol positions 112 being displayed in each subsequent game outcome 84 until a winning combination is achieved in a game outcome. For example, in one embodiment, if a winning combination is not achieved in the first instance 150, the gaming controller 16 may increase an amount of special symbol positions 112 being displayed during the second instance 152. If a winning combination is achieved in the second instance 152, the gaming controller 16 may display the same amount of special symbol positions 112 in the third instance, display a lesser amount of special symbol positions 112, or display the predetermined amount of special symbol positions 112.

In the illustrated embodiment, during the first instance 150, the gaming controller 16 randomly selects a first special symbol 126 from the predefined set of special symbols 116, and displays the selected first special symbol 126 in each special symbol position 112 of the first amount 136 of special symbols 116. During the second instance 152, the gaming controller 16 randomly selects a second special symbol 128 from the predefined set of special symbols 116, and displays the selected second special symbol 128 in each special symbol position 112 of the second amount 138 of special symbols 116. In the illustrated embodiment, the second special symbol 128 is different than the first special symbol 126. The gaming controller 16 may also select a different special symbol 116 to be displayed with each subsequent instance of the game 80. In one embodiment, the gaming controller 16 selects a special symbol, displays the special symbol in each of the special symbol positions, and spins and stops the reel 82 with the special symbol being displayed in each special symbol position. In one embodiment, the gaming controller 16 may replace the first special symbol 126 with the second special symbol 128 before spinning the reels in the second instance 152. In another embodiment, the gaming controller 16 may replace the first special symbol 126 with the second special symbol 128 while the reel 82 is spinning. In a further embodiment, the gaming controller 16 may stop the reel 82, determine if any special symbol positions 112 are being displayed in the display grid 90, and then replace the first special symbol 126 with the second special symbol 128.

In the illustrated embodiment, each of the first amount 136 and the second amount 138 includes at least one run 130 of consecutive special symbol positions 112. In one embodiment, the gaming controller 16 may display the first amount 136 with a first run 132 (shown in FIG. 6) of consecutive special symbol positions 112 and a second run 134 of consecutive special symbol positions 112. The gaming controller 16 may also select a first special symbol 126 to be displayed in each special symbol position 112 of the first run of consecutive special symbol positions 112, and select a second special symbol 128 to be displayed in each special symbol position 112 of the second run 134 of consecutive special symbol positions 112.

In one embodiment, the gaming controller 16 may receive a wager from a player and initiate a base game 154 in response to the received wager. The gaming controller 16 may determine an outcome of the base game 154 (shown in FIG. 13), detect the occurrence of a triggering event in the base game outcome, and award a bonus feature game in response to detecting the triggering event. In one embodiment, the bonus feature game may include a plurality of free spins, e.g. game instances 84. During each free spin, the gaming controller 16 determines an amount of special symbol positions 112 to be displayed with at least one reel 82, and displays the free spin with the determined amount of special symbol positions 112. In addition, for each subsequent free spin provided to the player during the bonus feature game, the gaming controller 16 may increase the amount of special symbol positions 112 being displayed with the reel 82. In one embodiment, the gaming controller 16 may also determine an amount of free spins awarded to the player as a function of the triggering event and/or as a function of the outcome of the base game 154. In addition, the gaming controller 16 may determine an amount of special symbol positions 112 being displayed with reel 82 as a function of the number of free spins awarded to the player.

For example, in one embodiment, the amount of special symbol positions 112 being displayed with the reel 82 may be provided as in the following chart, including the amount of free spins 84 provided to the player during the bonus feature game and the corresponding amount of special symbol positions 112 associated with each free spin of the bonus feature game. The following chart is for illustrative purposes only and does not limit the scope of the present invention.

| Amount of Free Spins Awarded in | Amount of Special Symbols Displayed with the Reel | | | |
|---|---|---|---|---|
| Bonus Game | $1^{st}$ Free Spin | $2^{nd}$ Free Spin | $3^{rd}$ Free Spin | $n^{th}$ Free Spin |
| 2 | 15 | 20 | — | — |
| 3 | 10 | 12 | 14 | — |
| n + 1 | 5 | 10 | 15 | 20 |

The first column represents the amount of free spins, e.g. game instances 84, provided to the player during the bonus feature game. The second column represents the first amount 136 of special symbol positions 112 being displayed in at least one reel 82 during the $1^{st}$ free spin, e.g. the first instance 150, of the bonus feature game. The third column represents the second amount 138 of special symbol positions 112 being displayed in the reel 82 during the $2^{nd}$ free spin, e.g. the second instance 152, of the bonus feature game. The fourth and fifth columns represent the amount of special symbol positions 112 being displayed with the reel 82 during each subsequent free spin.

In the illustrated embodiment, the gaming controller 16 determines an amount of free spins provided to the player during the bonus feature game, and determines an amount of special symbol positions displayed in each free spin as a function of the determined amount of free spins. For example, if the gaming controller 16 awards 3 free spins to the player during the bonus feature game, the gaming controller 16 displays the first amount 136 equal to 10 special symbol positions 112 in the first free spin, e.g. the first instance 150, and displays the second amount 138 equal to 12 special symbol positions 112 in the second free spin, e.g. the second instance 152.

In addition, in one embodiment, the gaming controller 16 may display a fewer amount of special symbol positions 112 in the first free spin if a greater number of free spins has been award. For example, if 2 free spins are awarded, the gaming controller 16 may initially display 15 special symbol positions 112 with the first reel 100. If 3 free spins are awarded, the gaming controller 16 may display 10 special symbol positions 112 with the first reel 100.

Figure 14:
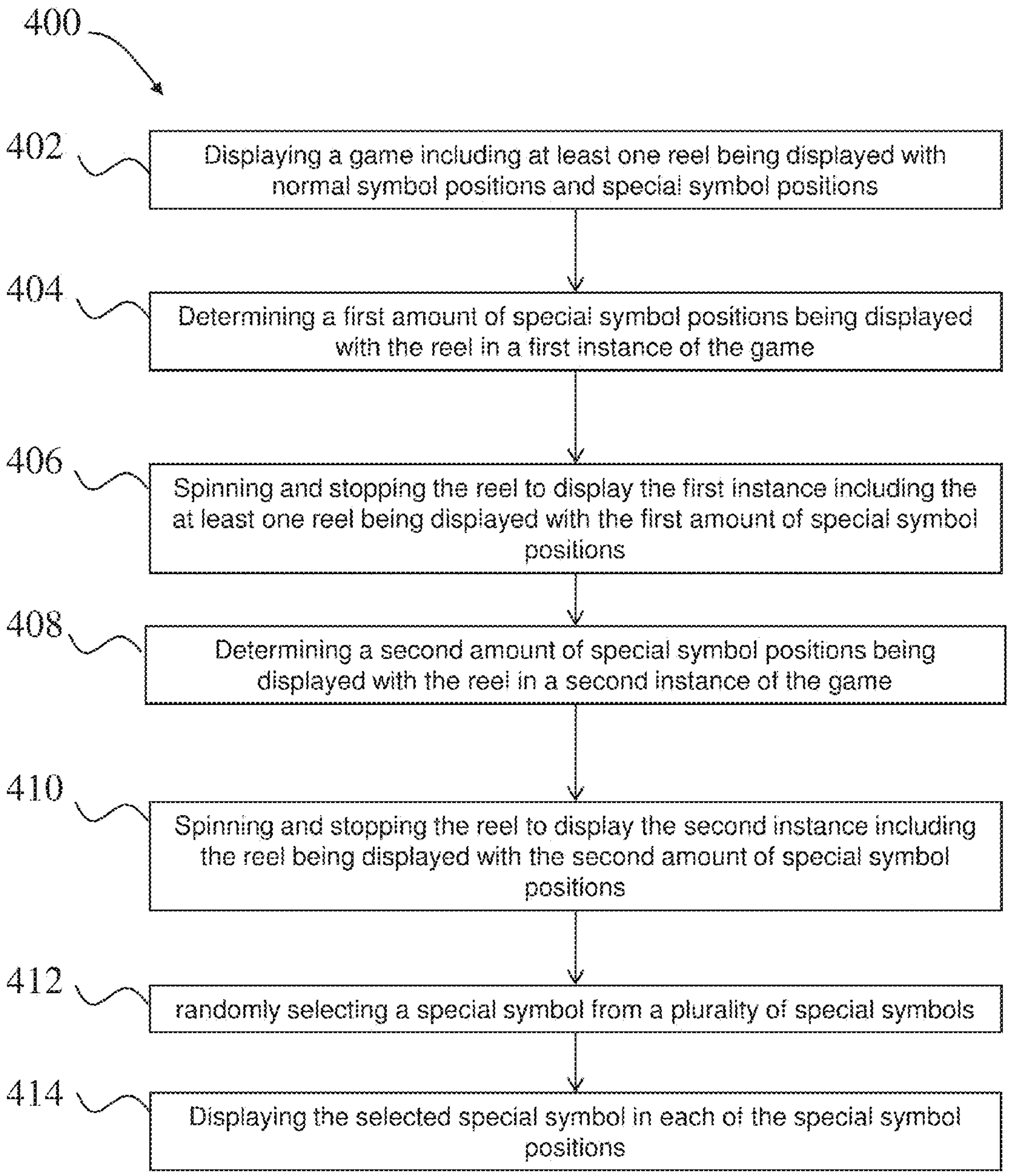
FIG. 14 is a flowchart of another method of allowing a player to play a gaming machine, according to an embodiment of the present invention.

FIG. 14 is a flowchart of another method 400 of allowing a player to play the gaming machine 10. In the illustrated embodiment, the method includes displaying 402 the game including at least one reel being displayed with a plurality of normal symbol positions and a plurality of special symbol positions, determining 404 a first amount of special symbol positions being displayed with the reel in a first instance of the game, and spinning 406 and stopping the at least one reel to display the first instance including the reel being displayed with the first amount of special symbol positions.

The method 400 also includes determining 408 a second amount of special symbol positions being displayed with the reel in a second instance of the game and spinning 410 and stopping the reel to display the second instance including the reel being displayed with the second amount of special symbol positions.

In one embodiment, the method 400 may also include determining a third amount of special symbol positions being displayed in the reel in a third instance of the game, wherein the third amount being different than the first and second amounts of special symbol positions, and spinning and stopping the reel to display the third instance including the reel being displayed with the third amount of special symbol positions.

In the illustrated embodiment, the method 400 includes randomly selecting 412 a special symbol of a plurality of special symbols and displaying 414 the selected special symbol in each of the special symbol positions.

In one embodiment, the method 400 may also include randomly selecting a first special symbol being displayed in each special symbol position of the first amount of special symbol positions and randomly selecting a second special symbol being displayed in each special symbol position of the second amount of special symbol positions.

In addition, the method 400 may also include displaying the first amount of special symbol positions including a first run of consecutive symbol positions and a second run of consecutive symbol positions, selecting a first special symbol being displayed in each of the first run of consecutive special symbol positions, and selecting a second special symbol being displayed in each of the second run of consecutive symbol positions.

An exemplary technical effect of the methods, systems, and computers described herein includes at least one of (a) displaying, on a display device, a game including at least one reel, the at least one reel including a plurality of symbol positions, the plurality of symbol positions including a plurality of normal symbols positions and a plurality of special symbol positions; (b) randomly generating an outcome of a game and displaying the game outcome on the display device; (c) randomly determining a number of special symbol positions being displayed on the at least one reel; and (d) spinning and stopping the at least one reel to display the generated game outcome, the at least one reel including the plurality of symbol positions having the determined number of special symbol positions.

The above-described systems and methods overcome at least some disadvantages of known gaming machines by providing a gaming machine that displays a reel including a plurality of special symbol positions and randomly selects the number of special symbol positions being displayed on the reel to increase a player's expectation of achieving a winning combination in the generated game. More specifically, the gaming machine randomly selects a number of special symbol positions being displayed on the reel, selects at least one special symbol, and displays the game outcome including the at least one reel having the selected special symbol being displayed in each of the selected number of special symbol positions. By providing a gaming machine that randomly selects a number of special symbol positions being displayed on at least one reel and selecting a special symbol being displayed in each of the special symbol positions, the player's expectation for achieving a win is increased and the enjoyment of the game is improved. Thus, the amount of time that the game is played by patrons of a gaming establishment is thereby increased.

In addition, the gaming machine increases an amount of special symbols being displayed with a reel during subsequent instances of the game. More specifically, the gaming machine may award a bonus feature game to a player as a function of an outcome of a main game, and provide an plurality of free spins with the bonus feature. The gaming machine may provide a first amount of special symbols being displayed with a reel in the first instance, e.g. first free spin, of the bonus feature game and increase the amount of special symbols being displayed with the reel in each subsequent free spin. By increasing the amount of special symbols appearing with the reel for each free spin, the chances of achieving a winning outcome by the player is increased for each subsequent free spin.

Exemplary embodiments of a gaming machine, a gaming system, and a method of allowing a player to play a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of operating a gaming machine, the gaming machine including a display device displaying a plurality of reels, a user input device for receiving inputs from a player and for accepting physical media indicating a monetary value to establish a credit balance, a database, and a controller including a processor programmed to execute a game program, the method comprising the steps of:

allowing the player, through the input device, to make a wager and adjusting the credit balance as a function of the wager;

displaying, by the controller on the display device, the plurality of reels including at least one reel including a plurality of symbol positions, the plurality of symbol positions being displayed with a plurality of normal symbol positions and a plurality of consecutive special symbol positions, the normal symbol positions being displayed with a plurality of game symbols;

receiving, by the controller, a signal indicating a wager being made by the player via the user input device, randomly generating an outcome of a base game, and spinning and stopping the plurality of reels to display the outcome of the base game;

detecting triggering condition appearing in the outcome of the base game and responsively awarding a number of free games as a function of the triggering condition;

determining a number of consecutive special symbol positions associated with each of the number of free games, a corresponding number of special symbol positions associated with each free game being determined as a function of the number of free games being awarded, wherein each free game includes a different number of consecutive special symbol positions;

initiating, by the controller, a first free game including a first number of consecutive special symbol positions being displayed with the at least one reel in the first free game;

selecting a first symbol from the database, the first symbol being displayed in each special symbol position during the first free game;

generating an outcome of the first free game and spinning and stopping the plurality of reels to display the outcome of the first free game on the display device including the at least one reel displaying the first symbol in each of the first number of consecutive special symbol positions;

initiating a second free game including a second number of consecutive symbol positions, the second number of consecutive special symbol positions being different than the first number of consecutive special symbol positions;

selecting a second symbol from the database, the second symbol being displayed in each special symbol position during the second free game;

spinning and stopping the plurality of reels to display the second free game including the at least one reel displaying the second symbol in each of the second number of consecutive special symbol positions; and, adjusting the credit balance as a function of the outcome of the first free game or an outcome of the second free game.

2. A method in accordance with claim 1, wherein each free game includes a greater number of consecutive special symbol positions than a previous free game.

3. A method in accordance with claim 1, wherein the first number of consecutive special symbol positions is equal to a predetermined number of special symbol positions.

4. A method in accordance with claim 1, including the steps of:

determining a third number of consecutive special symbol positions being displayed in the at least one reel in a third free game, the third number of consecutive special symbol positions being greater than the second number of consecutive special symbol positions; and spinning and stopping the at least one reel to display the third free game, the at least one reel being displayed with the third number of consecutive special symbol positions.

5. A method in accordance with claim 1, including the steps of:

displaying the game including a plurality of special symbols and a plurality of normal symbols;

randomly selecting at least one special symbol of the plurality of special symbols; and displaying the selected special symbol in each of the special symbol positions.

6. A method in accordance with claim 5, including the steps of:

randomly selecting a first special symbol being displayed in each special symbol position of the first number of consecutive special symbol positions; and randomly selecting a second special symbol being displayed in each special symbol position of the second number of consecutive special symbol positions.

7. A method in accordance with claim 1, wherein the first number of consecutive special symbol positions includes at least two runs of consecutive special symbol positions.

8. A method in accordance with claim 7, wherein the first number of consecutive special symbol positions includes a first run of consecutive symbol positions, a second run of consecutive symbol positions, and a normal symbol position between the first and the second runs of consecutive special symbol positions.

9. A method in accordance with claim 8, including the steps of:

selecting a first special symbol being displayed in each of the first run of consecutive special symbol positions; and selecting a second special symbol being displayed in each of the second run of consecutive symbol positions, the second symbol being different than the first symbol.

10. A gaming device, comprising:

a video display device displaying a plurality of reels;

a database including game symbols;

a user input device configured to generate a signal indicative of a player's selection input and to accept physical media indicating a monetary value to establish a credit balance; and a controller coupled to the display device and the user input device, the controller including a processor programmed to:

allow the player to make a wager and adjust the credit balance as a function of the wager;

display, on the display device, the plurality of reels including at least one reel being displayed with a plurality of symbol positions, the plurality of symbol positions including a plurality of normal symbol positions and a plurality of special symbol positions, the normal symbol positions being displayed with a plurality of game symbols;

receive a signal indicating a wager being made by the player via the user input device, randomly generate an outcome of a base game, and spin and stop the plurality of reels to display the outcome of the base game;

detect a triggering condition appearing in the outcome of the base game and responsively award a number of free games as a function of the triggering condition;

determine a number of consecutive special symbol positions associated with each of the number of free games, a corresponding number of special symbol positions associated with each free game being determined as a function of the number of free games being awarded, wherein each free game includes a different number of consecutive special symbol positions;

initiate a first free game including a first number of consecutive special symbol positions being displayed with the at least one reel in the first free game;

select a first symbol from the database, the first symbol being displayed in each special symbol position during the first free game;

generate an outcome of the first free game and spin and stop the plurality of reels to display the outcome of the first free game on the display device including the at least one reel displaying the first symbol in each of the first number of consecutive special symbol positions;

initiate a subsequent second free game including a second number of consecutive special symbol positions, the second number of consecutive special symbol positions being different than the first number of consecutive special symbol positions;

select a second symbol from the database, the second symbol being displayed in each special symbol position during the second free game;

spin and stop the plurality of reels to display the second free game including the at least one reel displaying the second symbol in each of with the second number of consecutive special symbol positions; and adjust the credit balance as a function of the outcome of the first free game or an outcome of the second free game.

11. A gaming device in accordance with claim 10, wherein each free game includes a greater number of consecutive special symbol positions than a previous free game.

12. A gaming device in accordance with claim 10, wherein the first number of consecutive special symbol positions is equal to a predetermined number of special symbol positions.

13. A gaming device in accordance with claim 10, the controller configured to:

determine a third number of consecutive special symbol positions being displayed in the at least one reel in a third free game, the third number of consecutive special symbol positions being greater than the second number of consecutive special symbol positions; and spin and stop the at least one reel to display the third free game, the at least one reel being displayed with the third number of consecutive special symbol positions.

14. A gaming device in accordance with claim 10, the controller configured to:

display the game including a plurality of special symbols and a plurality of normal symbols;

randomly select at least one special symbol of the plurality of special symbols; and display the selected special symbol in each of the special symbol positions.

15. A gaming device in accordance with claim 14, the controller configured to:

randomly select a first special symbol being displayed in each special symbol position of the first number of consecutive special symbol positions; and randomly select a second special symbol being displayed in each special symbol position of the second number of consecutive special symbol positions.

16. A gaming device in accordance with claim 10, wherein the first number of consecutive special symbol positions includes at least two runs of consecutive special symbol positions.

17. A gaming device in accordance with claim 16, wherein the first number of consecutive special symbol positions includes a first run of consecutive symbol positions, a second run of consecutive symbol positions, and a normal symbol position between the first and the second runs of consecutive symbol positions.

18. A gaming device in accordance with claim 17, the controller configure to:

select a first special symbol being displayed in each of the first run of consecutive special symbol positions; and select a second special symbol being displayed in each of the second run of consecutive symbol positions, the second symbol being different than the first symbol.

19. One or more non-transitory computer-readable storage media, having computer-executable instructions embodied thereon that causes a computer to function as a slot machine, wherein when executed by at least one processor, the computer-executable instructions cause the processor to:

establish a credit balance based on physical media indicating a monetary value received through an input device;

display, on a display device, a plurality of reels including at least one reel being displayed with a plurality of symbol positions, the plurality of symbol positions including a plurality of normal symbol positions and a plurality of consecutive special symbol positions;

allow the player to make a wager and adjust the credit balance as a function of the wager;

receive a signal indicating a wager being made by the player via the user input device, randomly generate an outcome of a base game, and spin and stop the plurality of reels to display the outcome of the base game;

detect a triggering condition appearing in the outcome of the base game and responsively award a number of free games as a function of the triggering condition;

determine a number of consecutive special symbol positions associated with each of the number of free games, a corresponding number of special symbol positions associated with each free game being determined as a function of the number of free games being awarded, wherein each free game includes a different number of consecutive special symbol positions;

initiate a first free game-including a first number of consecutive special symbol positions being displayed with the at least one reel in the first free game;

select a first symbol from a database, the first symbol being displayed in each special symbol position during the first free game;

generate an outcome of the first free game and spin and stop the plurality of reels to display the outcome of the first free game on the display device including the at least one reel displaying the first symbol in each of the first number of consecutive special symbol positions;

initiate a subsequent second free game including a second number of consecutive special symbol positions, the second number of consecutive special symbol positions being different than the first number of consecutive special symbol positions;

select a second symbol from the database, the second symbol being displayed in each special symbol position during the second free game;

spin and stop the plurality of reels to display the second free game including the at least one reel displaying the second symbol in each of the second number of consecutive special symbol positions; and, adjust the credit balance as a function of the outcome of the first free game or an outcome of the second free game.

20. The one or more computer-readable storage media according to claim 19, wherein each free game includes a greater number of consecutive special symbol positions than a previous free game.

21. The one or more computer-readable storage media according to claim 19, wherein the first number of consecutive special symbol positions is equal to a predetermined number of special symbol positions.

22. The one or more computer-readable storage media according to claim 19, wherein when executed by at least one processor, the computer-executable instructions cause the processor to:

determine a third number of consecutive special symbol positions being displayed in the at least one reel in a third free game, the third number of consecutive special symbol positions being greater than the second number of consecutive special symbol positions; and spin and stop the at least one reel to display the third free game, the at least one reel being displayed with the third number of consecutive special symbol positions.

23. The one or more computer-readable storage media according to claim 19, wherein when executed by at least one processor, the computer-executable instructions cause the processor to:

display the game including a plurality of special symbols and a plurality of normal symbols;

randomly select at least one special symbol of the plurality of special symbols; and display the selected special symbol in each of the special symbol positions.

24. The one or more computer-readable storage media according to claim 23, wherein when executed by at least one processor, the computer-executable instructions cause the processor to:

randomly select a first special symbol being displayed in each special symbol position of the first number of consecutive special symbol positions; and randomly select a second special symbol being displayed in each special symbol position of the second number of consecutive special symbol positions.

25. The one or more computer-readable storage media according to claim 19, wherein the first number of consecutive special symbol positions includes at least two runs of consecutive special symbol positions.

26. The one or more computer-readable storage media according to claim 25, wherein the first number of consecutive special symbol positions includes a first run of consecutive symbol positions, a second run of consecutive symbol positions, and a normal symbol position between the first and the second runs of consecutive symbol positions.

27. The one or more computer-readable storage media according to claim 26, wherein when executed by at least one processor, the computer-executable instructions cause the processor to:

select a first special symbol being displayed in each of the first run of consecutive special symbol positions; and select a second special symbol being displayed in each of the second run of consecutive symbol positions, the second symbol being different than the first symbol.

* * * * *